(12) United States Patent
Yoshida et al.

(10) Patent No.: US 10,699,827 B2
(45) Date of Patent: Jun. 30, 2020

(54) FILM, AND ELECTRICAL INSULATION SHEET, ADHESIVE TAPE, ROTATING MACHINE USING SAME

(71) Applicant: Toray Industries, Inc., Tokyo (JP)

(72) Inventors: Shohei Yoshida, Otsu (JP); Risa Hamasaki, Otsu (JP); Shigeru Aoyama, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 93 days.

(21) Appl. No.: 16/085,690

(22) PCT Filed: Mar. 10, 2017

(86) PCT No.: PCT/JP2017/009748
§ 371 (c)(1),
(2) Date: Sep. 17, 2018

(87) PCT Pub. No.: WO2017/169662
PCT Pub. Date: Oct. 5, 2017

(65) Prior Publication Data
US 2019/0096548 A1 Mar. 28, 2019

(30) Foreign Application Priority Data

Mar. 31, 2016 (JP) .................................. 2016-070875
Aug. 22, 2016 (JP) .................................. 2016-161672

(51) Int. Cl.
*H01B 17/54* (2006.01)
*H01B 17/56* (2006.01)
(Continued)

(52) U.S. Cl.
CPC .............. *H01B 17/54* (2013.01); *B32B 3/30* (2013.01); *B32B 27/20* (2013.01); *B32B 27/205* (2013.01);
(Continued)

(58) Field of Classification Search
CPC ........ H01B 17/54; H01B 3/421; H01B 17/56; B32B 3/30; B32B 27/20; B32B 27/36;
(Continued)

(56) References Cited

U.S. PATENT DOCUMENTS

| | | | |
|---|---|---|---|
| 2004/0023049 A1* | 2/2004 | Fujita | B29C 55/023 428/474.7 |
| 2004/0175560 A1* | 9/2004 | Suh | B32B 27/20 428/317.9 |

FOREIGN PATENT DOCUMENTS

| | | |
|---|---|---|
| JP | 04298538 A | 10/1992 |
| JP | 06183166 A | 7/1994 |

(Continued)

OTHER PUBLICATIONS

International Search Report and Written Opinion for International Application No. PCT/JP2017/009748, dated Jun. 6, 2017—7 pages.

*Primary Examiner* — Nathan L Van Sell
(74) *Attorney, Agent, or Firm* — Ratnerprestia

(57) ABSTRACT

Provided is a film having excellent electrical insulation performance, heat dissipation performance, and workability. In addition, by using the film, provided are an electrical insulation sheet having excellent heat conductivity, a rotating machine using the sheet, an adhesive tape, and the like. The number of coarse projections SPc (4000) on at least one surface of the film is 15 projections/mm² or greater.

10 Claims, 1 Drawing Sheet

(51) Int. Cl.

| | |
|---|---|
| *C09J 7/20* | (2018.01) |
| *B32B 3/30* | (2006.01) |
| *B32B 27/20* | (2006.01) |
| *H01B 3/42* | (2006.01) |
| *C08L 67/00* | (2006.01) |
| *C08K 3/00* | (2018.01) |
| *C08J 5/18* | (2006.01) |
| *B32B 27/36* | (2006.01) |
| *C08K 3/04* | (2006.01) |
| *C08K 3/06* | (2006.01) |
| *C08K 3/08* | (2006.01) |
| *C08L 67/02* | (2006.01) |
| *C08K 7/00* | (2006.01) |

(52) U.S. Cl.
CPC ............... *B32B 27/36* (2013.01); *C08J 5/18* (2013.01); *C08K 3/00* (2013.01); *C08K 3/04* (2013.01); *C08K 3/06* (2013.01); *C08K 3/08* (2013.01); *C08L 67/00* (2013.01); *C08L 67/02* (2013.01); *C09J 7/20* (2018.01); *H01B 3/421* (2013.01); *H01B 17/56* (2013.01); *C08J 2367/02* (2013.01); *C08K 7/00* (2013.01); *C09J 2205/106* (2013.01)

(58) Field of Classification Search
CPC ........ B32B 27/205; C08L 67/00; C08L 67/02; C09J 7/20; C09J 2205/106; C08K 7/00; C08K 3/00; C08K 3/04; C08K 3/06; C08K 3/08; C08J 2367/02; C08J 5/18
See application file for complete search history.

(56) References Cited

FOREIGN PATENT DOCUMENTS

| | | |
|---|---|---|
| JP | 08225728 A | 9/1996 |
| JP | 2005229104 A | 8/2005 |
| JP | 2008080672 A | 4/2008 |
| JP | 2013028753 A | 2/2013 |
| JP | 2013038179 A | 2/2013 |
| JP | 2017066391 A | 4/2017 |

* cited by examiner

FILM, AND ELECTRICAL INSULATION SHEET, ADHESIVE TAPE, ROTATING MACHINE USING SAME

CROSS REFERENCE TO RELATED APPLICATIONS

This is the U.S. National Phase application of PCT/JP2017/009748, filed Mar. 10, 2017, which claims priority to Japanese Patent Application No. 2016-070875, filed Mar. 31, 2016, and Japanese Patent Application No. 2016-161672, filed Aug. 22, 2016, the disclosures of these applications being incorporated herein by reference in their entireties for all purposes.

FIELD OF THE INVENTION

The present invention relates to a film. The present invention also relates to an electrical insulation sheet and an adhesive tape prepared by using such film.

BACKGROUND OF THE INVENTION

Polyester resins (in particular, polyethylene terephthalate, which is hereinafter referred to as PET, polyethylene-2,6-naphthalene dicarboxylate, and the like) and polyarylene sulfide resins (in particular, polyphenylene sulfide which is hereinafter referred to as PPS, and the like) are used in various applications because of their excellent properties such as mechanical properties, thermal properties, chemical resistance, electric properties, and moldability. The polyester film and the polyarylene sulfide film prepared by making these resins into a film have excellent mechanical properties and electric properties, and therefore, they are used in various applications including copper clad laminate, solar battery back sheet, adhesive tape, flexible printed board, membrane switch, planar heating element, flat cable, electric insulation materials such as insulation material for rotary machine and insulation material for battery, magnetic recording material, capacitor materials, packing materials, automobile materials, building materials, photographic applications, graphic applications, and thermal transfer applications.

Of these applications, the problem of heat generation and accumulation near the coil has recently surfaced in the application of rotary machine insulation materials (for example, insulation material for generators, insulation material for vehicle-borne motors, and insulation material for versatile industrial motors) due to the trend of size reduction and high output of the rotary machines. Temperature increase in the system induced by the heat generation and accumulation near the coil invites problems such as decrease in the output, increase in the electricity consumption, and decrease in the life of the material of the rotary machine. The problem of the system temperature elevation caused by the recent demand for the high output and reduced size has also surfaced in the applications of solar battery back sheet materials, reflector plate materials, LED board materials, circuit materials, and lithium ion battery materials.

In view of the situation as described above, there is a demand for a counter measure for the heat generated in the interior by conducting and dissipating the heat into the exterior and there is also a need for a film having high heat dissipation properties. Various films having high heat dissipation properties have been proposed and examples include a composite film having a protective layer comprising a PET film disposed on one surface or opposite surfaces of a graphite sheet having a high thermal conductivity (Patent Document 1) and a film comprising a biaxially stretched PET film containing a fibrous carbon material in its interior (Patent Documents 2 and 3).

PATENT DOCUMENTS

Patent Document 1: Japanese Unexamined Patent Publication (Kokai) No. 2008-80672
Patent Document 2: Japanese Unexamined Patent Publication (Kokai) No. 2013-28753
Patent Document 3: Japanese Unexamined Patent Publication (Kokai) No. 2013-38179

SUMMARY OF THE INVENTION

However, the technology of Patent Document 1 suffered from the problem of brittleness of the graphite sheet that resulted in poor workability as well as the problem of low thermal conductivity of the PET film serving as the protective layer which prevents full utilization of the high heat dissipation of the graphite sheet. The technologies of Patent Documents 2 and 3 suffered from the problem that the film could not be used in the applications requiring insulation properties due to the electroconductivity of the film. In the meanwhile, when the film material is used for heat dissipation purpose, improved adhesion at the interface between the site in need of the heat dissipation and the film material is important to reduce the heat resistance at the interface, and in view of such situation, the film material is often incorporated in the equipment by using an interface loading material such as adhesive, varnish, grease, or sticky agent that facilitates adhesion at the interface. However, since the films of Patent Document 1 to 3 had a smooth surface and the contact surface area between the interface loading material and the film was insufficient, the resulting high thermal resistance at the interface resulted in the risk of insufficient heat dissipation properties.

Accordingly, an object of the present invention is to provide a film having excellent electric insulation, heat dissipation, and workability properties.

In order to solve the problems as described above, the present invention has the constitution as described below.
(1) A film wherein at least one surface has a number of coarse projections SPc(4000) of at least 15/mm$^2$.
(2) A film according to (1) wherein the film has a layer containing inorganic particles (layer P1), and when the layer P1 has an inorganic particle content Vf1 (% by volume) and a porosity Va (% by volume), Va/Vf1 is up to 1.
(3) A film according to (2) wherein Nf/Vf1 is up to 25 when number of the inorganic particles per 10000 μm$^2$ is Nf in the cross section of the layer P1 cut perpendicular to the planar direction of the film and parallel to the longitudinal direction of the film.
(4) A film according to (2) or (3) wherein mean diameter of the corresponding circle of the inorganic particle is at least 3 μm in the cross section of the layer P1 cut perpendicular to the planar direction of the film and parallel to the longitudinal direction of the film.
(5) A film according to any one of (1) to (4) wherein the film has a layer containing inorganic particles (layer P1), and when the film has a thickness T (μm), and content of the inorganic particles in the thickness range of the surface to 0.1T is Vfa (% by volume) and content of the inorganic particles in the thickness range of 0.1T to 0.9T is Vfb (% by volume) on the film surface having a number of coarse projections SPc(4000) of at least 15/mm², Vfa/Vfb satisfies the relation: 0≤Vfa/Vfb≤1.

(6) A film according to any one of (1) to (5) wherein thermal conductivity in the film thickness direction is at least 0.15 W/mK, and surface specific resistance is at least $10^{13}$ Ω/□.

(7) A film according to any one of (1) to (6) wherein the film contains a polyester resin as its main component.

(8) A film according to any one of (1) to (7) wherein the surface having the number of coarse projections SPc(4000) of at least 15/mm² has a surface roughness Ra of at least 100 nm.

(9) An electrical insulation sheet prepared by using the film according any one of to (1) to (8).

(10) An adhesive tape prepared by using the film according to any one of (1) to (8).

(11) A rotating machine prepared by using the electrical insulation sheet according to (9).

The present invention is capable of providing a film having improved electric insulation, heat dissipation, and workability compared to conventional films. The film provided are adapted for use in the applications where electric insulation and heat dissipation abilities are important, for example, copper clad laminate, solar battery back sheet, adhesive tape, flexible printed board, membrane switch, planar heating element, flat cable, insulation material for rotary machine, insulation material for battery and other applications. The film is also adapted for use in adhesive tape, release film, transfer film, design sheet, building material, and other applications in view of its good surface properties.

DETAILED DESCRIPTION OF EMBODIMENTS OF THE INVENTION

Figure 1:
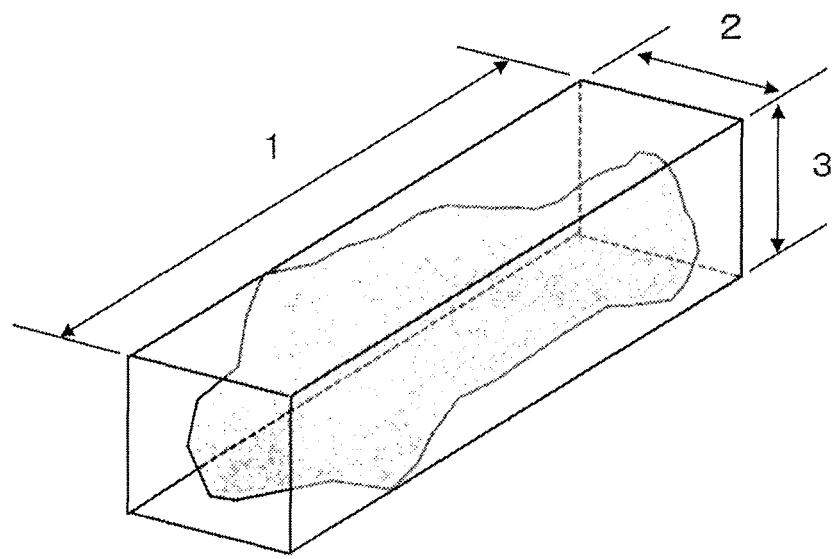
FIG. 1 is a schematic view showing an exemplary rectangular parallelepiped circumscribing a particle.

In the film of the present invention, at least one surface of the film should have a number of coarse projections SPc (4000) of at least 15/mm². SPc is an index representing the surface roughness. In the present invention, the SPc(4000) is the one determined by the measurement method as will be described later, and it represents number of the projections with the size of at least 4000 nm existing in the unit area. The "SPc(4000) of at least 15/mm²" means that the film has at least certain number of large protrusions on its surface. When at least one surface of the film has the SPc(4000) within the range as described above, surface area at the interface will be increased and efficient heat dissipation will be enabled. The SPc(4000) is more preferably at least 30/mm², and still more preferably at least 50/mm². When the SPc(4000) is less than 15/mm², contact area between the film and the interface loading material will be reduced, and the heat conductance at the interface may be inhibited. While there is no particular upper limit for the SPc(4000), the upper limit is preferably up to 1000/mm² and more preferably up to 800/mm² in view of preventing excessive decrease in the interval between the projections that may inhibit loading of the interface loading material.

The method used for realizing the SPc(4000) of the film surface within such range is not particularly limited, and exemplary methods include incorporation of inorganic particles in the film as well as provisions of surface irregularities on the film surface by using a mold having fine projections and recesses so that the SPc(4000) is within the range as described above. It is to be noted that when the SPc(4000) of the film surface is realized by the incorporation of the inorganic particles into the film, incorporation of particles having a large diameter at a high density will be required, and when the SPc(4000) of the film surface is realized by the incorporation of the inorganic particles into the film, slippage of the particles and interfacial peeling at the interface of the inorganic particles are preferably suppressed by controlling the type, surface activity, and content of the inorganic particles and also controlling the conditions used in the stretching.

In the present invention, the resin constituting the main component of the film is not particularly limited, and preferable examples include (i) polyester resins such as polyethylene terephthalate, polyethylene-2,6-naphthalate, polypropylene terephthalate, and polybutylene terephthalate; (ii) biodegradable resins such as aliphatic polyester resin, aliphatic aromatic polyester, polysaccharide, and starch-containing polymer; (iii) acryl resins such as poly(meth)acrylate; (iv) polyolefin resins such as polyethylene, polypropylene, polymethylpentene, polyisoprene, epoxy-modified polyolefin, acid-modified polyolefin, and alicyclic polyolefin resin; (v) other resins such as polyamide resin, polycarbonate, polystyrene, polyether, polyester amide, polyether ester, polyvinyl chloride, polyvinyl alcohol, polyacetal, polyarylene sulfide, polyether ether ketone, polyurethane, polysulfone, polyarylene oxide, polyimide, polyetherimide, polyester elastomer, polyamide elastomer, and polyolefin elastomer; and (vi) resins obtained by curing a thermos-setting resins such as epoxy resin and unsaturated polyester resin, and copolymers containing such resin as their component, and mixtures thereof. Of these, the preferred for use are polyester resin and polyarylene sulfide resin in view of the good film formation ability, heat resistance, and size stability, and the more preferred for use are polyester resin in view of the good film formation ability and workability. In the description of the invention, the term "main component" is used when its content in the entire components is at least 50% by volume, and preferably at least 60% by volume.

In the present invention, the term "polyester" means a resin wherein the main component has a dicarboxylic acid component and a diol component. The polyester used in the present invention is preferably the one wherein the heat of crystal fusion ΔHm determined from the peak area of the fusion peak in differential scanning calorimetric chart of the 2nd RUN is at least 15 J/g when the heat of crystal fusion ΔHm is measured according to JIS K-7122 (1987) by heating the resin from 25° C. to 300° C. at a temperature elevation rate of 20° C./minute (1st RUN), maintaining this state for 5 minutes, quenching the resin to the temperature of up to 25° C., and again heating the resin from 25° C. to 300° C. at a temperature elevation rate of 20° C./minute to obtain the differential scanning calorimetric chart of the 2nd RUN. More preferably, the heat of crystal fusion ΔHm is at least 20 J/g, more preferably at least 25 J/g, and most preferably at least 30 J/g. When such polyester is used, the orientation and the crystallization will be facilitated in the production method as will be described later and production of a highly heat resistant film will be enabled. It is to be noted that, in the description of the invention, the "component" is the minimum unit that can be obtained by hydrolysis. When the term "main component" is used in this description, the content of the component in the entire components is at least 80% by mole, more preferably at least 90% by mole, and still more preferably at least 95% by mole.

Exemplary non-limiting dicarboxylic acid components constituting the polyester include aliphatic dicarboxylic acids such as malonic acid, succinic acid, glutaric acid, adipic acid, suberic acid, sebacic acid, dodecanedioic acid, dimer acid, eicosanedioic acid, pimelic acid, azelaic acid, methylmalonic acid, and ethylmalonic acid; alicyclic dicarboxylic acids such as adamantine dicarboxylic acid, norbornene dicarboxylic acid, isosorbide, cyclohexane dicarboxylic acid, and decalin dicarboxylic acid; aromatic dicarboxylic acids such as terephthalic acid, isophthalic acid, phthalic acid, 1,4-naphthalene dicarboxylic acid, 1,5-naphthalene dicarboxylic acid, 2,6-naphthalene dicarboxylic acid, 1,8-naphthalene dicarboxylic acid, 4,4'-diphenyldicarboxylic acid, 4,4'-diphenylether dicarboxylic acid, 5-sodium sulfoisophthalic acid, anthracene dicarboxylic acid, phenanthrene dicarboxylic acid, 9,9'-bis(4-carboxyphenyl)fluorene; and ester derivatives thereof. Also included are such carboxylic acid components having on their carboxyl terminal an oxy acid such as l-lactide, d-lactide, or hydroxybenzoic acid or a derivative thereof; or two or more oxy acid linked with each other added thereto. These may be used alone or optionally in combination of two or more.

Exemplary non-limiting diol components constituting the polyester include aliphatic diols such as ethylene glycol, 1,2-propanediol, 1,3-propanediol, 1,4-butanediol, 1,2-butanediol, and 1,3-butanediol; alicyclic diols such as cyclohexane dimethanol, spiroglycol, and isosorbide; aromatic diols such as bisphenol A, 1,3-benzene dimethanol, 1,4-benzenedimethanol, and 9,9'-bis(4-hydroxyphenyl)fluorine; and two or more of such diols linked together; which may be used alone or optionally in combination of two or more.

When the main component is a polyester resin in the film of the present invention, content of the aromatic dicarboxylic acid component in the entire dicarboxylic acid components is preferably at least 90% by mole and up to 100% by mole, more preferably at least 95% by mole and up to 100% by mole, still more preferably at least 98% by mole and up to 100% by mole, still more preferably at least 99% by mole and up to 100% by mole, and most preferably at least 100% by mole, namely, the entire dicarboxylic acid component being constituted from an aromatic carboxylic acid component. When this content is less than 90% by mole, the resulting film may suffer from reduced heat resistance. When the content of the aromatic dicarboxylic acid component in the entire dicarboxylic acid component is at least 90% by mole and up to 100% by mole, orientation and crystallization will be facilitated in the production method as described below and the resulting film will enjoy an improved heat resistance.

When the main component of the film of the present invention is a polyester resin, the constitutional repeating unit comprising a dicarboxylic acid component and a diol component is preferably the one comprising ethylene terephthalate, ethylene-2,6-naphthalene dicarboxylate, propylene terephthalate, butylene terephthalate, 1,4-cyclohexylene dimethylene terephthalate, ethylene-2,6-naphthalene dicarboxylate, and preferably, such unit is used for the main constitutional repeating unit. It is to be noted that the term "main constitutional repeating unit" is used when the total of the constitutional repeating units as described above constitutes at least 80% by mole, more preferably at least 90% by mole, and still more preferably at least 95% by mole of the entire constitutional repeating unit. The main constitutional repeating unit preferably comprises ethylene terephthalate or ethylene-2,6-naphthalene dicarboxylate in view of cost, ease of polymerization, and heat resistance. In this case, a relatively inexpensive film for general application having an improved heat resistance can be obtained when ethylene terephthalate is used for the constitutional repeating unit, while a film with higher heat resistance can be obtained when ethylene-2,6-naphthalene dicarboxylate is used for the constitutional repeating unit.

The polyester can be obtained by polycondensing an adequate combination of the components as described above (the dicarboxylic acid and the diol), and also preferred is copolymerization of the component having at least 3 carboxyl group and/or hydroxy group. In such a case, copolymerization rate of the component having three or more carboxyl group and/or hydroxy group in relation to the entire components of the polyester is preferably at least 0.005% by mole and up to 2.5% by mole in view of improving the film stretching capability.

In the film of the present invention, intrinsic viscosity (hereinafter referred to as IV) of the polyester, in the case when the main component is a polyester resin, is preferably at least 0.6, more preferably at least 0.65, still more preferably at least 0.68, and most preferably at least 0.7. When the IV is too low, there is a risk that the desired mechanical properties may not be realized or lost with time inviting embrittlement of the film due to the excessively low mutual entwining of the molecules after the incorporation of the inorganic particles as will be described layer. The IV of the polyester of at least 0.6 in the film of the present invention enables production of a film having high mechanical properties and high durability. The upper limit of the IV is not particularly limited, while it is preferably up to 1.0 and more preferably up to 0.9 in view of preventing excessive increase in the time required for the polymerization which results in the inadvantageously increased cost and difficulty in melt extrusion.

Exemplary methods for producing the polyester having the IV in such range include a method wherein a resin composition which has reached the predetermined melt viscosity in the melt polymerization is ejected in the form of a strand which is then cut into chips, and a method wherein chips are prepared at an intrinsic viscosity lower than the target melt viscosity and the chips are subjected to solid polymerization. Of these methods, when the target IV is at least 0.65, the preferred method is the one wherein chips are prepared at an intrinsic viscosity lower than the target melt viscosity and then conducting the solid polymerization in view of suppressing degradation by heat and also in view of reducing the number of the carboxyl terminal group. In addition, for increasing the IV of the film, the solid polymerization is preferably conducted after incorporating the inorganic particles in the polyester by the method as described below because excessive crystallization will be suppressed in the subsequent film formation after the incorporation of the inorganic particles in the polyester by the production method as described below and the stretching is thereby facilitated so that the resulting film will be provided with improved mechanical properties.

When the main component is a polyester resin in the film of the present invention, melting temperature Tm of the polyester is preferably at least 240° C. and up to 290° C. The melting temperature Tm as used herein is the melting temperature Tm obtained by DSC in a temperature elevation process (at a temperature elevation rate of 20° C./min) by the method according to JIS K-7121 (1987), and more specifically, by heating from 25° C. to 300° C. at a temperature elevation rate of 20° C./minute (1st RUN), maintaining this temperature for 5 minutes, quenching to a temperature of up to 25° C., again elevating the temperature from 25° C. to 300° C. at a temperature elevation rate of 20° C./minute, and evaluating the temperature of the peak top in the crystal fusion peak of the 2nd run, and using this peak top temperature for the melting temperature Tm of the polyester. The melting temperature Tm is more preferably at least 245° C. and up to 275° C. and still more preferably at least 250° C. and up to 265° C. The melting temperature Tm of less than 240° C. is unpreferable since such melting temperature may result in the insufficient heat resistance of the film while the melting temperature Tm in excess of 290° C. is also unpreferable due to the risk of inviting difficulty in the working by extrusion.

When the main component is a polyester resin in the film of the present invention, number of the terminal group of the carboxyl group of the polyester is preferably up to 40 equivalent weight/t, more preferably up to 30 equivalent weight/t, and still more preferably up to 20 equivalent weight/t. When the number of the carboxyl terminal group is high, catalytic action of the protons from the carboxyl terminal group will be strong and hydrolysis and thermal decomposition are promoted, and this may accelerate film deterioration even if the structure is controlled. In contrast, a film undergoing suppressed degradation by hydrolysis and thermal decomposition can be produced when the number of the carboxyl terminal group is controlled to such range. It is to be noted that control of the number of the carboxyl terminal group to the range of up to 40 equivalent weight/t may be accomplished by using a polyester obtained by, for example, 1) the method of conducting esterification between a dicarboxylic acid component and a diol component, ejecting the esterified polymer when the melt viscosity has reached the predetermined value by in the melt polymerization, cutting the thus ejected strand, and subjecting the resulting chips to solid phase polymerization, 2) the method wherein a buffer is added at a timing after the completion of the transesterification or the esterification and before the early stage of the polycondensation (when the intrinsic viscosity is less than 0.3), or a combination thereof. Such polyester may also be produced by adding a buffer or an end capping agent during the film formation. An end capping agent is a compound which reacts with the carboxyl terminal group or the hydroxy terminal group of the polyester to become bonded to the terminal group to vanish catalytic activity of the protons from the terminal group, and exemplary end capping agents include a compound having a substituent such as oxazoline group, epoxy group, carbodiimide group, or isocyanate group. When an anti-hydrolysis agent is used, the amount used is preferably at least 0.01% by weight and more preferably at least 0.1% by weight in relation to the entire amount of the polyester. When an anti-hydrolysis agent is added in combination with the polyester as described above, deterioration of the polyester by the addition of the inorganic particles can be suppressed, and the resulting film will be provided with improved mechanical properties and heat resistance. Upper limit of the content of the anti-hydrolysis agent is preferably up to 2% by weight, more preferably up to 1% by weight, and still more preferably up to 0.8% by weight in view of the risk of the poor flame retardancy caused by the use of excessive anti-hydrolysis agent.

The film of the present invention has a layer containing the inorganic particles (layer P1), and when the content of the inorganic particles in the layer P1 is Vf1 (% by volume) and porosity in the layer P1 is Va (% by volume), Va/Vf1 is preferably up to 1. The "inorganic particle content Vf1 (% by volume)" as used herein is the one determined by the measurement method as described below, and in the cross-sectional SEM image of the layer P1 cut in the direction perpendicular to the planar direction of the film and parallel to the longitudinal direction of the film, the inorganic particle content Vf1 is determined as the proportion of the area of the inorganic particles in relation to the cross-sectional area of the film. The "porosity Va (% by volume)" as used herein is the one determined by the measurement method as described below, and in the cross-sectional SEM image of the layer P1 cut in the direction perpendicular to the planar direction of the film and parallel to the longitudinal direction of the film, the porosity Va is determined as the proportion of the pore area in relation to the cross-sectional area of the film. The Va/Vf1 is more preferably up to 0.8, and still more preferably up to 0.6. When the Va/Vf1 is in excess of 1, the film will suffer from insufficient heat dissipation due to the presence of a large amount of air having a low thermal conductivity. The lower limit of the Va/Vf1 is 0. A high heat dissipation is realized when the Va/Vf1 is up to 1 in the film of the present invention.

When the main component is a polyester resin in the film of the present invention, inorganic particles having a substituent which reacts with the polyester (hereinafter referred to as a reactive substituent) on their surface are preferably used to realize the Va/Vf1 of up to 1. The "reactive substituent" as used herein is a substituent capable of reacting with and bonding to the carboxyl terminal group or the hydroxy terminal group of the polyester, and examples include substituents such as oxazoline group, epoxy group, carbodiimide group, isocyanate group, and acid anhydride group. The particularly preferred is epoxy group in view of the high reactivity with the polyester and high heat resistance of the thus formed bond. More particularly, when the inorganic particles have a reactive substituent on their surface, bonds are formed during the kneading of the polyester and the inorganic particles, and formation of a firm interface is thereby enabled. This in turn suppresses interfacial peeling at the interface between the polyester and the inorganic particles in the stretching step as will be described later.

In the film of the present invention, amount of the reactive substituent per unit area of the inorganic particles is preferably at least $0.2 \times 10^{-6}$ mole/m$^2$ and up to $1.4 \times 10^{-4}$ mole/m$^2$, more preferably at least $1 \times 10^{-5}$ mole/m$^2$ and up to $1 \times 10^{-4}$ mole/m$^2$, and still more preferably at least $1.3 \times 10^{-5}$ mole/m$^2$ and up to $5 \times 10^{-5}$ mole/m$^2$. When this amount is less than $0.2 \times 10^{-6}$, the bond between the polyester and the inorganic particles will be insufficient, and obvious interfacial peeling will occur during the stretching and this will result in the reduced thermal conductivity. When this amount is in excess of $1.4 \times 10^{-4}$ mole/m$^2$, amount of the bond will be excessively large and this will result in the reduced stretching ability. In the film of the present invention, amount of the reactive substituent per unit area of the inorganic particles of at least $0.2 \times 10^{-6}$ mole/m$^2$ and up to $1.4 \times 10^{-4}$ mole/m$^2$ enables thermal conductivity simultaneously with the stretching ability.

In the film of the present invention, the inorganic particles are preferably those treated with a surface treating agent having a reactive substituent. Exemplary surface treating agents include silane coupling agents having oxazoline group, epoxy group, carbodiimide group, acid anhydride group, or isocyanate group, titanium coupling agents, and aluminate coupling agents. Of these, the preferred for use include silane coupling agents having epoxy group such as 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, and glycidoxyoctyltrimethoxysilane; silane coupling agents having isocyanate group such as 3-isocyanate propyltriethoxysilane and 3-isocyanate propyltrimethoxysilane; and silane coupling agents having an acid anhydride group such as 3-trimethoxysilylpropylsuccinic acid anhydride. Alkoxy oligomers having a reactive substituent are also preferable. Also preferred include resins prepared by copolymerizing a monomer having epoxy group such as glycidyl methacrylate or a monomer having an isocyanate group such as 2-isocyanate ethyl methacrylate with styrene, ethylene, propylene, acryl, or the like, polycarbodiimide, and oxazoline group-containing resins. Of these, when the main component of the film of the present invention is a polyester resin, the most preferred among these are silane coupling agents having epoxy group such as 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, and glycidoxyoctyltrimethoxysilane; silane coupling agents having isocyanate group such as 3-isocyanate propyltriethoxysilane, 3-isocyanate propyltrimethoxysilane; silane coupling agents having an acid anhydride group such as 3-trimethoxysilylpropylsuccinic anhydride; and alkoxy oligomers having a reactive substituent in view of forming a firm interface which can form a bond with the polyester and the inorganic particles. Also preferred are use of the surface treating agents having a reactive substituent as a mixture and use of a mixture of a surface treating agent having a reactive substituent and a surface treating agent not having a reactive substituent.

In view of improving the thermal conductivity and stretching ability of the film, content Vf1 (% by volume) of the inorganic particles in the layer P1 is preferably 5 to 25% by volume, more preferably 7.5 to 25% by volume, and still more preferably 10 to 20% by volume. When the content of the inorganic particles is less than 5% by volume, probability of the contact between the inorganic particles will be reduced, and the film may exhibit inferior heat dissipation. On the other hand, the content in excess of 25% by volume may adversely affect stretching ability of the film and workability in the use of the film as an insulation material.

The film of the present invention is preferably the one wherein Nf/Vf1 is up to 25 when number of the inorganic particles per 10000 µm$^2$ is Nf in the cross section of the layer P1 cut perpendicular to the planar direction of the film and parallel to the longitudinal direction of the film. The Nf/Vf1 is more preferably up to 15, and still more preferably up to 10. When Nf/Vf1 is in excess of 25, probability of the contact between the inorganic particles will be reduced, and this may result in the reduced thermal conductivity of the film and insufficient formation of the projections and recesses of the film surface by the inorganic particles, detracting from the heat dissipation at the interface. Lower limit of the Nf/Vf1 is not particularly limited. The lower limit, however, is preferably at least 1 in view of stretching ability in the film formation as well as the winding ability.

In the film of the present invention, the inorganic particles in the layer P1 preferably comprise inorganic particles having an aspect ratio of at least 2. The "particles having an aspect ratio of at least 2" means the particles having the ratio (l/t) of the length (l) to the thickness (t) (hereinafter referred to as the aspect ratio) of at least 2 when the primary particle is surrounded by the circumscribed rectangular parallelepiped as shown in FIG. 1, and the length of the longest side of the circumscribed rectangular parallelepiped is defined as length (l), the length of the shortest side is defined as thickness (t), and the length of the remaining side is defined width (b). The film containing the particles having the aspect ratio of at least 2 has a higher probability of the contact between the particles compared to the film containing the particles having the aspect ratio of less than 2, and the probability of the contact increases with the increase in the aspect ratio. The aspect ratio is more preferably at least 3 and still more preferably at least 5. While there is no particular upper limit for the aspect ratio, the upper limit is preferably up to 40 and more preferably up to 30 in view of preventing breaking and cracking of the inorganic particles during the kneading of the particles into the resin.

In the film of the present invention, mean diameter of the corresponding circle of the inorganic particle is preferably at least 3 µm in the cross section of the layer P1 cut perpendicular to the planar direction of the film and parallel to the longitudinal direction of the film, and the mean diameter of the corresponding circle is more preferably at least 5 µm, and still more preferably at least 8 µm. The diameter of the corresponding circle is the diameter of the true circle when a true circle is depicted so that its area would be the same as the cross-sectional area of the inorganic particle obtained by observing the cross-section. When the mean diameter of the corresponding circle of the inorganic particle is less than 3 µm, formation of the projections and recesses on the film surface by the inorganic particles is suppressed and the heat dissipation at the interface may be inhibited. The upper limit of the mean diameter of the corresponding circle is preferably up to 50 µm to improve stretching ability of the film and improve insulation properties and workability when used for the insulation material or the like.

Exemplary materials of the inorganic particles which may be used in the film of the present invention include metals such as gold, silver, copper, platinum, palladium, rhenium, vanadium, osmium, cobalt, iron, zinc, ruthenium, praseodymium, chromium, nickel, aluminum, tin, zinc, titanium, tantalum, zirconium, antimony, indium, yttrium, lanthanum, and silicon; metal oxides such as zinc oxide, titanium oxide, cesium oxide, antimony oxide, tin oxide, indium tin oxide, yttrium oxide, lanthanum oxide, zirconium oxide, aluminum oxide, magnesium oxide, and silicon oxide; metal fluorides such as lithium fluoride, magnesium fluoride, aluminum fluoride, and rhyolite; metal phosphates such as calcium phosphate; carbonates such as calcium carbonate; sulfates such as barium sulfate and magnesium sulfate; nitrides such as silicon nitride, boron nitride, and carbon nitride; silicates such as wollastonite, sepiolite, or xonotlite; and titanate salt such as potassium titanate, or strontium titanate.

These inorganic particles may be used in combination of two or more.

In view of the situation that the film of the present invention is likely to be used in the application requiring electric insulation, the inorganic particles preferably comprises a non-electroconductive material such as metal oxide such as zinc oxide, titanium oxide, cesium oxide, antimony oxide, tin oxide, indium tin oxide, yttrium oxide, lanthanum oxide, zirconium oxide, aluminum oxide, magnesium oxide, or silicon oxide; metal fluoride such as lithium fluoride, magnesium fluoride, aluminum fluoride, or cryolite; metal phosphate such as calcium phosphate; carbonate such as calcium carbonate; sulfate such as barium sulfate or magnesium sulfate; nitride such as silicon nitride, boron nitride, or carbon nitride; silicate such as wollastonite, sepiolite, or xonotlite; or titanate such as potassium titanate.

The film of the present invention may preferably have a thickness T of at least 3 µm and up to 500 µm, more preferably at least 5 µm and up to 400 µm, and still more preferably at least 10 μm and up to 300 μm. When the thickness is less than 3 μm, the film will suffer from inferior film formability and the film may experience increased risk of tearing in its stretching. In the meanwhile, a film having a thickness in excess of 500 μm may experience difficulty in cutting and bending, namely, poor workability, when the film is used as an insulation material. In the film of the present invention, the film will enjoy both film formability and workability when the film thickness is at least 3 μm and up to 500 μm.

The film of the present invention may preferably have a thermal conductivity in the thickness direction of at least 0.15 W/mK, more preferably at least 0.20 W/mK, and still more preferably at least 0.25 W/mK since the thermal conductivity in the thickness direction of the film in such range allows use of the film where electric insulation and heat dissipation abilities are significant, for example, in the applications such as copper clad laminate, solar battery back sheet, adhesive tape, flexible printed board, membrane switch, planar heating element, flat cable, insulation material for rotary machine, insulation material for battery and other applications. Exemplary means for improving the thermal conductivity in the film thickness direction include use of the more preferable starting materials as described above and control of the molecular chain orientation during the stretching.

The film of the present invention may preferably have a surface specific resistance of at least $1 \times 10^{13} \Omega/\square$, and more preferably at least $5 \times 10^{13} \Omega/\square$. When the surface specific resistance is in such range, the film will be adapted for use as electric insulation material.

The surface of the film of the present invention having the SPc(4000) of at least 15/mm$^2$ may preferably have a surface roughness Ra of at least 100 nm, more preferably at least 300 nm, and still more preferably at least 500 nm. When the surface roughness is less than 100 nm, formation of the projections and recesses on the film surface by the inorganic particles is suppressed, and this may invite inhibition of the heat dissipation at the interface. The upper limit is preferably up to 3000/nm and more preferably up to 2000/nm in view of preventing excessive decrease in the interval between the projections that may inhibit loading of the interface loading material. In the present invention, the SRa is determined by the measurement method as will be described later.

The method used for realizing the SRa of the film surface within such range is not particularly limited, and exemplary methods include incorporation of inorganic particles in the film as well as provisions of surface irregularities on the film surface by using a mold having fine projections and recesses so that the Ra will be within the range as described above.

In the film of the present invention, when the film has a thickness of T (μm), and at the surface where the number of the coarse projections SPc(4000) is at least 15/mm$^2$, the inorganic particle content from the surface to the thickness of 0.1T is Vfa (% by volume) and the inorganic particle content from the thickness 0.1T to the thickness 0.9T is Vfb (% by volume), Vfa/Vfb preferably satisfies 0≤Vfa/Vfb<1. In the present invention, the Vfa/Vfb is determined by the method as will be described later, and smaller Vfa/Vfb means that the film surface layer has a lower content of the inorganic particles. As a consequence, falling of the inorganic particles off the film surface will be suppressed and interfacial peeling at the interface with the inorganic particles will be prevented. Such constitution exhibits marked merits in the application where the film is adhered to a smooth surface, since the adhesion to the smooth surface will be stronger with the decrease in the risk of the falling of the inorganic particles and interfacial peeling at the interface with the inorganic particles. More preferably, 0.1≤Vfa/Vfb≤0.8, and still more preferably, 0.2≤Vfa/Vfb≤0.5. When the Vfa/Vfb is at least 1, a large amount of inorganic particles will be present at the surface, and the particles may fall off the film surface to contaminate the system in that step or interfacial peeling may occur at the interface with the inorganic particles. While the lower limit of the Vfa/Vfb is 0, the lower limit is preferably at least 0.1 in view of improving thermal conductivity of the surface. In order to realize the relation: 0≤Vfa/Vfb<1, the type and surface activity of the inorganic particles should be controlled, and also, a laminate structure comprising layers having lower inorganic particle content and higher inorganic particle content is preferably laminated with the layer having lower inorganic particle content provided on the surface of at least one side of the film.

The film of the present invention may be a monolayer film solely comprising the layer P1 as described above or a film having a laminate constitution comprising the layer P1 and a different layer (the different layer is also hereafter abbreviated as layer P2) disposed on at least one surface of the layer P1, and use of such laminate constitution is also preferable. Of such laminate constitution, the preferred is the constitution comprising the layer P1 and the layer P2 having a particle content lower than that of the P1 disposed on at least one surface of the layer P1 in view of suppressing the inorganic particles from falling off the film surface and also in view of preventing interfacial peeling at the interface with the inorganic particles. More preferred is the laminate constitution comprising the layer P1 having the layer P2 having a particle content lower than that of the P1 disposed on opposite surfaces of the layer P1. In this case, the main component of the layer P2 is preferably constituted from a polyester resin in view of the film formation ability.

Also, the layer P2 preferably has inorganic particles incorporated therein in view of improving the heat dissipation, and the inorganic particles used may be those as described above. In such a case, the inorganic particle content Vf2 (% by volume) of the layer P2 preferably satisfies the relation 0≤Vf1/Vf2<1 in relation to the inorganic particle content Vf1 (% by volume) of the layer P1 so that the film satisfies the relation of 0≤Vfa/Vfb<1. The inorganic particle content Vf2 more preferably satisfies 0≤Vf1/Vf2≤0.8 and still more preferably satisfies 0≤Vf1/Vf2≤0.5. When the Vf1/Vf2 is at least 1, a large amount of inorganic particles will be present at the surface, and the particles may fall off the film surface to contaminate the system in that step or interfacial peeling may occur at the interface with the inorganic particles.

The layer P2 preferably has content Vf2 (% by volume) of the inorganic particles of 0 to 5% by volume, more preferably 0 to 3% by volume, and still more preferably 0 to 2% by volume in view of improving the film stretching ability. The content in excess of 5% by volume may adversely affect stretching ability of the film and workability in the use of the film as an insulation material.

Ratio of the layer P1 to the layer P2 is preferably such that the proportion of the layer P1 to the entire film is at least 40% by volume, more preferably at least 50% by volume, and still more preferably at least 70% by volume. When the proportion of the layer P1 is less than 40% by volume, the effect of the improvement of the thermal conductivity by the layer P1 may become insufficient.

The film of the present invention exhibits high electric insulation, heat dissipation, and workability. In view of such properties, the film of the present invention is well adapted for use in copper clad laminate, solar battery back sheet, adhesive tape, flexible printed board, membrane switch, planar heating element, flat cable, and electrical insulation sheet such as insulation material for rotary machine and insulation material for battery. In particular, when the film is used as an electrical insulation sheet for a rotary machine, the machine will exhibit improved output and efficiency compared to the machine using conventional electrical insulation sheet due to the improved heat dissipation. The film is also adapted for use in adhesive tape, release film, transfer film, design sheet, building material, and other applications in view of its good surface properties.

The film of the present invention preferably has an elongation at break of at least 10%, more preferably at least 20%, and still more preferably at least 30%. When the elongation at break of the film of the present invention is less than 10%, the film will be susceptible to breakage during the film formation and the working, for example, in the conveying and cutting during the continuous working. In the film of the present invention, the film formation ability and the workability are simultaneously realized by the elongation at break of at least 10%.

The film of the present invention preferably has a burning distance evaluated by UL94-VTM test method of up to 125 mm, more preferably up to 115 mm, still more preferably up to 105 mm, still more preferably up to 100 mm, and most preferably up to 95 mm. When the burning distance evaluated by UL94-VTM test method is up to 125 mm in the film of the present invention, a product with higher safety can be produced, for example, in the production of a back sheet for a solar battery.

Figure 2:
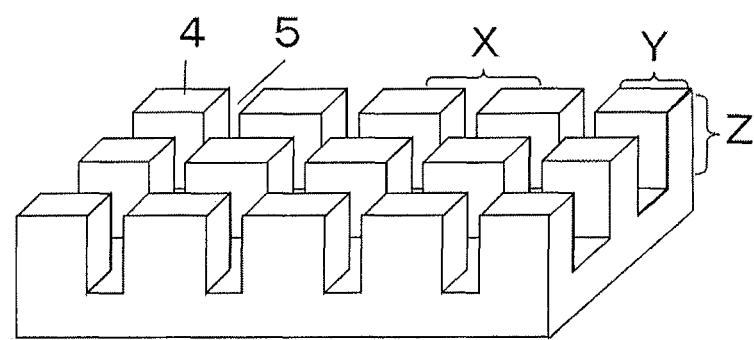
FIG. 2 is a schematic view showing an embodiment of the mold morphology.

In the film of the present invention, when the film surface is processed by using a mold having fine projections and recesses so that the SPc(4000) of the film surface is within the necessary range, use of a mold as shown in FIG. 2 having projections 4 arranged in dot pattern at an even interval is preferable for improving the heat dissipation from the film surface. The shape of the mold projections may be any shape such as triangle, quad lateral, hexagon, circle, ellipse, or shapes resembling such shape. Pitch X of the mold projections is preferably at least 20 μm and up to 200 μm, more preferably at least 50 μm and up to 150 μm. When the pitch is in excess of 200 μm, the heat dissipation from the interface may be insufficient due to the excessively low number of projections on the film surface. When the pitch is less than 20 μm, provision of the projections and the recesses to the film surface may become difficult or the distance between the projections provided may become too short, and the loading of the interface loading material may become insufficient detracting from the workability. Width Y of the mold projections is preferably a length that is at least 0.25 fold and up to 0.75 fold, and more preferably at least 0.4 fold and up to 0.6 fold of the pitch X of the mold projections. When the width Y is less than 0.25 fold or more than 0.75 fold of the pitch X, the provision of the projections and the recesses on the film surface by working may become difficult. Height Z of the mold projections is at least 5 μm and more preferably at least 10 μm. When the height of the mold projections is less than 5 μm, the shape of the projections and the recesses formed on the film surface becomes less steep, and the heat dissipation at the interface may become insufficient. The film processed is preferably a film wherein area magnification in the stretching is up to 10, and more preferably up to 8. Use of a film having an area magnification in excess of 10 may result in the insufficient provision of the projections and the recesses on the film surface.

Next, the method for producing the film of the present invention is described by referring to the embodiment wherein the main component is a polyester resin, which by no means limits the scope of the present invention.

(Step 1: Polymerization of the Polyester)

The polyester is prepared from the dicarboxylic acid component and the diol component as described above by polycondensation through esterification or transesterification so that the intrinsic viscosity would be at least 0.4. The transesterification may be promoted by using a known transesterification catalyst such as magnesium acetate, calcium acetate, manganese acetate, cobalt acetate, or calcium acetate in optional presence of a polymerization catalyst such as antimony trioxide. In the case of the esterification, addition of several ppm of an alkaline metal such as potassium hydroxide will suppress by-production of diethylene glycol and resistance to heat and hydrolysis will also be improved.

The catalysts that can be used in the polycondensation include ethylene glycol solution of germanium dioxide, antimony trioxide, titanium alkoxide, and titanium chelate compound.

Other additives that may be used include magnesium acetate used for providing static electricity with the film and calcium acetate for the co-catalyst, which are used in an amount not adversely affecting the merits of the present invention. Also, various particles may be added to provide lubricity with the film, and the particles may be internally precipitated by using a catalyst.

(Step 2: Surface Treatment of the Inorganic Particles)

When inorganic particles are subjected to surface treatment, the surface treatment may be conducted by a method such as i) dispersing the particles in the solvent and adding a surface treating agent or a solution/dispersion of the surface treating agent to the particle dispersion while stirring the dispersion, or ii) adding a solution/dispersion of the surface treating agent while stirring the powder of the inorganic particles. When the surface treating agent is a resin surface treating agent, a preferred method is iii) melt kneading the inorganic particles and the surface treating agent. Amount of the surface treating agent added is preferably at least 0.1 part by weight and up to 5 parts by weight when the weight of the inorganic particles is 100 parts by weight. The amount is more preferably at least 0.2 part by weight and up to 3 parts by weight, and still more preferably at least 0.5 part by weight and up to 1.5 parts by weight. When the amount is less than 0.1 part by weight, the bond between the polyester and the inorganic particles will be insufficient in the melt kneading of the polyester and the inorganic particles in the subsequent step, and interfacial peeling will occur during the stretching and this will result in the reduced thermal conductivity. When the amount is in excess of 5 parts by weight, amount of the bond will be excessively large and this will result in the reduced stretching ability.

(Step 3: Production of the Polyester Resin Composition)

The method used for obtaining the polyester resin composition containing the polyester obtained in the step 1 and the inorganic particles obtained in the step 2 is preferably a method wherein the polyester and the inorganic particles are preliminarily melt kneaded by using a vented twin screw kneeing extruder or a tandem extruder. In this process, in order to retain the shape of the inorganic particles, the inorganic particles are preferably supplied when the polyester has been melted and the inorganic particles are supplied from the side feed to the extruder so that the shape of the inorganic particles is retained.

In the incorporation of the inorganic particles in the polyester by the melt kneading, the polyester undergoes thermal hysteresis, and the polyester will experience substantial deterioration. Accordingly, when a high concentration master pellets having an inorganic particle content higher than the inorganic particle content of the layer P1 are prepared and these master pellets are mixed with the polyester to dilute and control the amount of the inorganic particles in the layer P1 to the desired content, degradation of the polyester can be suppressed and this is preferable in view of stretching ability, mechanical properties, heat resistance, and the like. In addition, use of the high concentration master pellets having inorganic particle content higher than the inorganic particle content in the layer P1 after, the solid phase polymerization is particularly preferred in view of increasing molecular weight and further reducing the number of the carboxyl terminal groups. The solid phase polymerization is preferably conducted at a temperature in the range of 60° C. lower than the melting temperature Tm of the polyester to 30° C. lower than the melting temperature Tm of the polyester and at a degree of the vacuum of up to 0.3 Torr.

(Step 4: Production of the Film)

When the film of the present invention is a film having a monolayer constitution solely comprising the layer. P1, a method wherein the starting material for the layer P1 is heated and melted in the extruder and then extruded from the nozzle to the cooled cast drum to form a sheet (melt casting method) can be used. Other methods that can be used include a method wherein the starting material for the layer P1 is dissolved in a solvent, the solution is extruded from a nozzle onto a support such as casting drum or endless belt in the form of a membrane, and then the solvent is removed from the thus produced membrane layer by drying to form the membrane into a sheet (solution casting method). Of these methods, the preferred is the sheet formation by the melt casting in view of the high productivity (the step wherein a sheet formation is accomplished by melt casting is hereinafter referred to as the melt extrusion step).

When the production is conducted by the melt extrusion step, the composition containing the polyester and the inorganic particles is dried, and by using an extruder, the composition is subjected to melt extrusion in sheet form from the nozzle and cooled by adhering and solidifying the sheet on a drum kept at a surface temperature of at least 10° C. and up to 60° C. by applying static electricity to obtain a sheet to be stretched.

In the melt extrusion using the extruder, the melting is conducted in nitrogen atmosphere, and the time between the supplying of the chips to the extruder to the extrusion from the nozzle should be as short as possible which is typically up to 30 minutes, more preferably up to 15 minutes, and still more preferably up to 5 minutes in view of suppressing the deterioration caused by the decrease of the molecular weight and suppressing increase in the number of the carboxyl terminal group.

When the film of the present invention has a laminate structure including the layer P2, the two mutually different materials are separately supplied to extruders for melting, laminated before ejecting from the nozzle, and then co-extruded in sheet form.

Next, the resulting sheet to be stretched is biaxially stretched at a temperature not lower than the glass transition temperature Tg. The biaxial stretching method used may be either consecutive biaxial stretching wherein the stretching in the longitudinal direction and the stretching in the width direction are separately conducted or simultaneous biaxial stretching wherein the stretching in the longitudinal direction and the stretching in the width direction are simultaneously conducted. Exemplary stretching conditions used include 1) in the case of the simultaneous biaxial stretching, use of an stretching temperature in the range of glass transition temperature Tg of the polyester to up to "Tg+15° C.", 2) in the case of consecutive biaxial stretching, use of the stretching temperature of the first axis in the range of the glass transition temperature Tg of the polyester to up to "Tg+15° C." (and more preferably Tg to up to "Tg+10° C.") and the stretching temperature of the second axis in the range of at least "Tg+5° C." to up to "Tg+25° C.".

The stretching ratio is typically at least 1.5 and up to 3.5 and more preferably at least 2.0 and up to 3.0 for both the longitudinal direction and the width direction and for both the simultaneous biaxial stretching and the consecutive biaxial stretching. The area stretching ratio determined by combining the stretching ratio in the longitudinal direction and the stretching ratio in the width direction is typically at least 2 and up to 12 and more preferably at least 4 and up to 10. When the area stretching ratio is less than 2, the resulting film may suffer from low orientation detracting from the mechanical strength and the heat resistance. In the meanwhile, the area stretching ratio in excess of 12 is likely invite breakage in the stretching and increase in the porosity of the resulting film, inviting loss of the thermal conductivity.

Next, the resulting biaxially stretched film is provided with sufficient crystal orientation, and in order to provide plane property and size stability with the film, the film is subjected to a heat treatment at temperature Th which is at least the glass transition temperature Tg of the polyester and less than the melting temperature Tm of the polyester for at least 1 second and up to 30 seconds. After gradual and uniform cooling, the film is cooled to room temperature. In the production method of the film of the present invention, the heat treatment temperature Th preferably has a difference "Tm−Th" with the melting temperature Tm of the polyester of at least 20° C. and up to 90° C., more preferably at least 25° C. and up to 70° C., and still more preferably at least 30° C. and up to 60° C. In addition, in the heat treatment step as described above, the film may be optionally subjected to a relaxing treatment of 3 to 12% in the width direction or the longitudinal direction, and subsequently to a corona discharge treatment for improving the adhesion with other material. The film is then wound to obtain the film of the present invention.

When the surface irregularity is provided with the film surface by using a mold having fine projections and recesses, this step may be conducted by methods using cast drums, stretching rolls, or stretching nip rolls having the fine projections and recesses in the film formation, and a method wherein the resulting biaxially stretched film is pressed by using a mold having fine projections and recesses.

Next, the method for producing the film of the present invention is described by referring to the embodiment wherein the main component is a polyarylene sulfide resin, which by no means limits the scope of the present invention.

(Step 1: Polymerization of Polyphenylene Sulfide)

Sodium sulfide and p-dichlorobenzene are reacted in an amide polar solvent such as N-methyl-2-pyrrolidone (NMP) at a high temperature and high pressure. If necessary, this reaction may be conducted by adding a copolymerization component such as trihalobenzene. The polymerization reaction is allowed to proceed at 230 to 280° C. by adding potassium hydroxide and an alkali metal salt of a carboxylic acid and the like as an agent for controlling the degree of polymerization.

After the polymerization, the polymer is cooled and the polymer in the form of slurry in water is subjected to filtration to obtain the polymer in the form of particles. The particles are then stirred in an aqueous solution such as acetate at 30 to 100° C. for 10 to 60 minutes, washed several times by ion exchanged water at 30 to 80° C., and dried to obtain PPS powder. This powder polymer was washed with NMP at an oxygen partial pressure of up to 10 Torr and more preferably up to 5 Torr, washed with ion exchanged water for several times at 30 to 80° C., and dried at a reduced pressure of up to 5 Torr. The resulting powder polymer was substantially linear PPS polymer, and stable film formation by stretching was thereby enabled.

(Step 2: Surface Treatment of the Inorganic Particles)

When inorganic particles are subjected to surface treatment, the surface treatment may be conducted by a method such as i) dispersing the particles in the solvent and adding a surface treating agent or a solution/dispersion of the surface treating agent to the dispersion while stirring the particle dispersion, or ii) adding a solution/dispersion of the surface treating agent while stirring the powder of the inorganic particles. When the surface treating agent is a resin surface treating agent, a preferred method is iii) melt kneading the inorganic particles and the surface treating agent. Amount of the surface treating agent added is preferably at least 0.1 parts by weight and up to 5 parts by weight when the weight of the inorganic particles is 100 parts by weight.

(Step 3: Production of the Polyphenylene Sulfide Resin Composition)

The method used for obtaining the polyphenylene sulfide resin composition containing the polyphenylene sulfide obtained in the step 1 and the inorganic particles obtained in the step 2 is preferably a method wherein the polyphenylene sulfide and the inorganic particles are preliminarily melt kneaded by using a vented twin screw kneading extruder or a tandem extruder. In this process, in order to retain the shape of the inorganic particles, the inorganic particles are preferably supplied when the polyphenylene sulfide has been melted and the inorganic particles are supplied from the side feed to the extruder. The gut-form polymer ejected from the extruder is cooled in water bath or the like and cut by the method commonly used in the art to produce pellets comprising the polymer having the particles dispersed therein (such pellets may be hereinafter referred to as particle pellets). In the meanwhile, the polyphenylene sulfide powder obtained in Step 1 may also be solely produced into pellets (such pellets may be hereinafter referred to as particle-free pellets), and such particle-free pellets can be used in the production of the film by mixing with the particle pellets.

(Step 4: Production of the Film)

The particle pellets and/or the particle-free pellets obtained in the step 3 are dried at reduced pressure, and introduced in an extruder having the melting section heated to a temperature in the range of 300 to 350° C. and preferably 310 to 340° C. The melted polymer that has passed through the extruder is passed through a filter and the melted polymer is ejected in sheet form by using a T die nozzle. The temperature of the filter section and the nozzle is preferably controlled to a temperature 3 to 20° C. and more preferably 5 to 15° C. higher than the temperature of the melting section of the extruder. The resulting sheet article is cooled and solidified by adhering the sheet to a cooling drum having a surface temperature of 20 to 70° C. to obtain the film to be stretched which is substantially non-oriented.

Next, this film to be stretched is biaxially stretched for biaxial orientation. The stretching method used may be consecutive biaxial stretching, simultaneous biaxial stretching, or a combination thereof. In the following, the method is explained for the embodiment using the consecutive biaxial stretching.

After heating the film to be stretched by using heating rolls, the film is stretched at a stretching ratio of at least 1.5 and up to 3.5 respectively in the longitudinal direction and the width direction. The stretching ratio is more preferably at least 2.0 and up to 3.0. The area stretching ratio determined by combining the stretching ratio in the longitudinal direction and the stretching ratio in the width direction is typically at least 2 and up to 12 and more preferably at least 4 and up to 10. When the area stretching ratio is less than 2, the resulting film may suffer from insufficient orientation detracting from the mechanical strength and the heat resistance. In the meanwhile, the area stretching ratio in excess of 12 is likely invite breakage during the stretching and excessive increase in the porosity of the resulting film, inviting loss of the thermal conductivity. The stretching temperature is preferably 70 to 130° C., and more preferably 80 to 110° C.

Next, the biaxially stretched film is subjected to a heat treatment under tension. The temperature of the heat treatment is preferably a temperature in the range of 160 to 280° C., and the heat treatment is preferably conducted in single stage or multi-stage of two or more stages. In the heat treatment, the film is preferably subjected to a relaxing treatment in the film width direction in the range of 0 to 10% at the heat treatment temperature in view of improving the thermal size stability. In the case of two-stage heat treatment, the first stage heat treatment is preferably conducted at a temperature in the range of 160 to 220° C. and the second stage heat treatment is preferably conducted at a temperature in the range of 230 to 280° C. which is higher than the temperature of the first stage in view of improving the plane property of the film and stable film formation. After the heat treatment, the film is cooled to room temperature, and subsequently, the film is optionally subjected to corona discharge treatment or the like for further improvement in the adhesion with other materials. The film is then wound to obtain the film of the present invention.

[Evaluation Method of the Properties]

A. Analysis of Polyester Composition

The polyester was hydrolyzed with an alkali, and each component was analyzed by gas chromatography or high-performance liquid chromatography to determine compositional ratio of the components from the peak area. An embodiment is shown below. The analysis for the dicarboxylic acid component and other components was conducted by high-performance liquid chromatography. The measurement conditions used may be known conditions. Exemplary measurement conditions used were as described below.

Apparatus: Shimadzu Corporation LC-10A
Column: YMC-Pack ODS-A, 150×4.6 mm, S-5 µm, 120A
Column temperature: 40° C.
Flow rate: 1.2 ml/min
Detector: UV 240 nm Diol component and other components were quantitatively analyzed using gas chromatography by a known method. Exemplary measurement conditions were as described below.

Apparatus: Shimadzu 9A (manufactured by Shimadzu Corporation)
Column: SUPELCOWAX-10 capillary column 30 m Column temperature: 140° C. to 250° C. (temperature elevation rate 5° C./min)

Flow rate: nitrogen, 25 ml/min

Detector: FID

B. Intrinsic Viscosity IV

The film was dissolved in 100 ml of orthochlorophenol (resin concentration C in the solution, 1.2 g/ml), and the viscosity of the solution at 25° C. was measured by Ostwald viscometer. The viscosity of the solvent was also measured by the same procedure. [η] was calculated by using the following formula (1) by using the thus measured solution viscosity and solvent viscosity, and the resulting value was used for the intrinsic viscosity (IV).

$$\eta sp/C=[\eta]+K[\eta]^2 \cdot C \quad (1)$$

(In this formula, ηsp=(solution viscosity/solvent viscosity) −1 and K is Huggins constant (0.343 was used)). It is to be noted that the measurement was conducted after separating the insoluble component such as inorganic particles.

C. Glass Transition Temperature Tg, Melting Temperature Tm, and Crystal Fusion Heat ΔHm Glass transition temperature Tg, melting temperature Tm, and crystal fusion heat ΔHm of the film were measured according to JIS K-7121 (1987) and JIS K-7122 (1987) by using differential scanning calorimeter "Robot DSC-RDC220" manufactured by Seiko Electronics Industries for the apparatus and Disk Session "SSC/5200" for the data analysis by the procedure as described below.

(1) 1st RUN Measurement 5 mg of the film sample was weighed in the sample pan, and the resin was heated at a temperature elevation rate of 20° C./minute from 25° C. to 300° C. (320° C. in the case of the PPS resin) and retained the state for 5 minutes, and then quenched to a temperature of up to 25° C.

(2) 2nd RUN

Immediately after completing the measurement of the 1st RUN, the measurement was conducted by elevating the temperature from 25° C. to 300° C. (320° C. in the case of the PPS resin) at a temperature elevation rate of 20° C./minute. In the thus obtained differential scanning calorimetric chart of the 2nd RUN, the glass transition temperature was determined according to the method described in JIS K-7121 (1987) (The glass transition temperature was determined from the intersection point of straight line at equal distance in the y axis direction from the straight line extended from each base line and the curve at the incrementally changing glass transition). The peak top temperature of the crystal fusion peak was used for the melting temperature Tm, and the crystal fusion heat ΔHm was determined according to the method described in JIS K-7122 (1987).

D. Elongation at Break

The film was evaluated for the elongation at break according to ASTM-D882 (1997). The sample was cut at a size of 1 cm×20 cm, and the elongation at break was measured at a distance between the chucks of 5 cm and tensile speed of 300 mm/min. In the measurement, an arbitrary direction of the film was designated 0°, and samples were cut out from the film plane by changing the direction by the increment of 10° from −90° to 90°, and the direction with the minimum elongation at break was designated the longitudinal direction of the film. The average of the elongation at break in the longitudinal direction and the elongation at break in the direction perpendicular to the longitudinal direction was used for the elongation at break of the film.

E. Number of Coarse Projections SPc(4000) and Surface Roughness SRa

Surface morphology was measured according to JIS-B0601 (1994) by stylus method using an Ultrafine Microfigure Measuring Instrument (three dimensional surface roughness meter) under the following conditions to measure surface roughness SRa.

Measurement apparatus: three dimensional ultrafine microfigure measuring instrument (Model ET-4000A) manufactured by Kosaka Laboratory Ltd.

Analyzer: three dimensional surface roughness analyzer (Model TDA-31)

Stylus: tip radius, 0.5 μm; diameter, 2 μm; made of diamond

Stylus pressure: 100 μN

Measurement direction: measurement was conducted once in the longitudinal direction of the film and once in width direction of the film, and the average was calculated X measurement length: 1.0 mm X feed speed: 0.1 mm/s. (measurement speed)

Y feed pitch: 5 μm (measurement interval)

Y line number: 81 (measurement number)

Z magnification: 20 (longitudinal magnification)

Lower cut off: 0.20 mm (warpage cut off value)

Higher cut off: R+W mm (roughness cut off value) (R+W means no cut off)

Filter system: Gaussian spatial type

Levelling: Yes (slope correction)

Standard area: 1 mm$^2$

The number of coarse projections SPc(4000) indicating the projection number of at least 4000 nm per standard area was calculated by the analysis in the analyzer system under the following setting.

Conditions of the slice level: fixed vertical interval

Central pitch level: 0.05 μm

Vertical interval: 0.025 μm

Lower limit: 3975 nm

Central level: 4000 nm

Upper limit: 4025 nm

F. Porosity Va

Porosity of the layer P1 was determined by the procedure of the following (A1) to (A5). It is to be noted that the measurement was conducted ten times in total by randomly changing the site of the film cutting, and the arithmetic mean was used for the porosity Va (% by volume) of the layer P1.

(A1) The film was cut by using a microtome in the direction perpendicular to the planar direction of the film and parallel to the film longitudinal direction (the direction defined in the measurement of the elongation at break) without crushing the film cross-section in the thickness direction.

(A2) Next, the cross-section was observed with a scanning electron microscope to obtain an image which has been expanded 3000 fold. The site of the observation was randomly selected in the layer P1 so that vertical direction of the image was parallel with the thickness direction of the film, and the horizontal direction of the image was parallel with the longitudinal direction of the film.

(A3) In the images obtained in (A2), area of the P1 layer (the total area including the pores and inorganic particles in the layer P1) was measured and this area was designated A. It is to be noted that, when there was difficulty in distinguishing the interface between the P1 layer and other layers in the image, the same sample cross-section was analyzed by means of polarizing observation using a differential interference microscope, and the position of the interface of the layer P1 was found to estimate the area of the layer P1.

(A4) Area of all pores in the layer P1 in the image was measured, and this value was designated the total area B. The pores measured included not only the case where the entire pore appeared in the image but also the case where only some parts of the air bubble appeared in the image.

(A5) B was divided by A (B/A) and multiplied by 100 to determine area percentage of the pores in the layer P1. This value was used for the porosity Va (% by volume).

G. Inorganic Particle Content Vf1 and Inorganic Particle Number Nf of the Layer P1 and Mean Diameter of the Corresponding Circle of the Inorganic Particle The inorganic particle content Vf1 and the inorganic particle number Nf of the layer P1 and the mean diameter of the corresponding circle of the inorganic particle were determined by the procedures (B1) to (B7). It is to be noted that the measurement was conducted ten times in total by randomly changing the site of the film cutting, and the arithmetic mean of the measurements was used for the inorganic particle content Vf1 (% by volume), the inorganic particle number Nf, and the mean diameter (μm) of the corresponding circle of the inorganic particle in the layer P1.

(B1) The film was cut by using a microtome in the direction perpendicular to the planar direction of the film and parallel to the film longitudinal direction (the direction defined in the measurement of the elongation at break) without crushing the film cross-section in the thickness direction.

(B2) Next, the cross-section was observed with a scanning electron microscope to obtain an image which has been expanded 3000 fold. The site of the observation was randomly selected in the layer P1 so that vertical direction of the image was parallel with the thickness direction of the film, and the horizontal direction of the image was parallel with the longitudinal direction of the film.

(B3) In the images obtained in (B2), area of the P1 layer (the total area including the pores and inorganic particles in the layer P1) was measured and this area was designated A. It is to be noted that, when there was difficulty in distinguishing the interface between the P1 layer and other layers in the image, the same sample cross-section was analyzed by means of polarizing observation using a differential interference microscope, and the position of the interface of the layer P1 was found to estimate the area of the layer P1.

(B4) Area of all inorganic particles in the layer P1 in the image was measured, and this value was designated the total area C. The inorganic particles measured included not only the case where the entire inorganic particle appeared in the image but also the case where only some parts of the inorganic particle appeared in the image. It is to be noted that, when there was difficulty in distinguishing the location of the inorganic particles in the image, the same sample cross-section was analyzed by energy dispersive X-ray spectroscopy, and the area was calculated after distinguishing the part comprising the inorganic substance.

(B5) C was divided by A (C/A) and multiplied by 100 to determine area percentage of the inorganic particles in the layer P1. This value was used for the inorganic particle content Vf1 (% by volume).

(B6) The number of all inorganic particles observed in (B4) was calculated, and this number was designated the number of inorganic particles Nf.

(B7) Area of each inorganic particle observed in (B4) was determined, and the diameter of the corresponding true circle when a true circle having the same area was depicted was designated the diameter of the corresponding circle (μm) of the inorganic particle. The diameter of the corresponding circle was determined for all particles observed, and their arithmetic mean was used for the mean diameter (μm) of the corresponding circle.

H. Film Thickness T (μm), Inorganic Particle Content Vfa (% by Volume) in the Range of the Film Surface to the Thickness of 0.1T, and the Inorganic Particle Content Vfb (% by Volume) in the Range of Thickness 0.1T to Thickness 0.9T The film thickness T (μm), inorganic particle content Vfa (% by volume) in the range of the film surface to the thickness of 0.1T, and the inorganic particle content Vfb (% by volume) in the range of thickness 0.1T to thickness 0.9T were determined by the procedures of the following (C1) to (C7). The measurement was conducted 10 times in total by randomly changing the film cutting position, and the arithmetic mean of the values was respectively used for the film thickness T (μm), the inorganic particle content Vfa (% by volume) in the range of the film surface to thickness 0.1T, and the inorganic particle content Vfb (% by volume) in the range of thickness 0.1T to thickness 0.9T.

(C1) The film was cut by using a microtome in a direction perpendicular to the planar direction of the film and parallel to the film longitudinal direction (the direction defined in the measurement of the elongation at break) without crushing the film cross-section in the thickness direction.

(C2) Next, the cross-section was observed with a scanning electron microscope to obtain an image which has been expanded 3000 fold. The site of the observation was randomly selected so that vertical direction of the image was parallel with the thickness direction of the film, and the horizontal direction of the image was parallel with the longitudinal direction of the film. The site of the observation was also moved in the thickness direction to prepare an image which is continuous from one surface to the other surface.

(C3) In the images obtained in (C2), area (the total area including the pores and inorganic particles in the film) in the range of the surface to the thickness 0 to 0.1T was measured, and this value was designated Aa. Similarly, the area in the range of the surface to the thickness 0.1T to 0.9T was measured and the total area was designated Ab.

(C4) In the film of the images, area of all inorganic particles in the range of the surface to the thickness 0 to 0.1 was measured, and this value was designated the total area Ba. The inorganic particles measured included not only the case where the entire inorganic particle in the range of thickness 0 to 0.1T appeared in the image but also the case where only some parts of the particle appeared in the image. It is to be noted that, when there was difficulty in distinguishing the location of the inorganic particles in the image, the same sample cross-section was analyzed by energy dispersive X-ray spectroscopy, and the area was calculated after distinguishing the part comprising the inorganic substance. Similarly, area of all inorganic particles in the range of the surface to the thickness 0.1T to 0.9T was measured, and this value was used for the total area Bb.

(C5) Ba was divided by Aa (Ba/Aa) and multiplied by 100 to determine area percentage of the inorganic particles in the range of the surface to the thickness of 0 to 0.1T, and this value was used for inorganic particle content Vfa (% by volume) in the range of the surface to 0.1T. Similarly, Bb was divided by Ab (Bb/Ab) and multiplied by 100 to determine inorganic particle content Vfb (% by volume) in the range of 0.1T to 0.9T. It is to be noted that the film thickness T (μm) was determined by measuring the thickness of arbitrarily chosen 5 sites for the stuck of 10 films according to JIS K7130 (1992) A-2 by using a dial gauge, and dividing the average thereof by 10 for use as the film thickness T (µm).

I. Thermal Conductivity in the Film Thickness Direction

After measuring the film thickness by using a dial gauge thickness meter (manufactured by Mitutoyo Corporation) having a flat tip, aluminum was deposited on opposite surfaces of the film by vapor deposition using a bell-jar type vapor deposition system to a thickness such that when laser beam from a laser pointer was directed to one surface of the film, the laser beam failed to pass through the film when visually inspected from the other side of the film. Next, after thinly coating Laser light absorbing spray (Black Guard Spray FC-153 manufactured by Fine Chemical Japan Co., LTD.) on opposite surfaces of the film and drying, square samples of 10 mm×10 mm were cut out, and thermal diffusivity α (m²/s) in the film thickness direction was measured at the measurement temperature of 25° C. by using an Xeflash analyzer (LFA467 Nanoflash manufactured by NETZSCH). The measurement was conducted 4 times, and the average was used for the thermal diffusivity, and the thermal conductivity was calculated by the following equation (2).

$$\text{Thermal conductivity (W/mK)} = \alpha(m^2/s) \times \text{specific heat (J/kg·K)} \times \text{density (kg/m}^3) \quad (2)$$

The specific heat used was the value determined according to JIS K-7123 (1987). The density used was the one obtained by using a specimen with the size of 30 mm×40 mm cut from the film by using an electronic specific gravity meter, (SD-120L manufactured by Mirage Boeki) and conducting the measurement for 10 times at room temperature (23° C.) in an atmosphere with relative humidity of 65%. The average calculated was used for the density.

J. Surface Specific Resistance

The surface specific resistance of the film was measured by using digital ultra-high resistance/micro current meter R8340 (manufactured by Advantest Corporation). The measurement was conducted on each of the opposite surfaces at arbitrarily chosen 10 locations in the surface, and the average was determined for opposite surfaces. The lower value of the obtained average values was used for the surface specific resistance. The specimens used for the measurement had been controlled for their moisture in the room at 23° C. and relative humidity of 65% for 24 hours. The resulting values were evaluated by the following criteria. A and B are practically acceptable.

A: surface specific resistance is at least $5 \times 10^{13} \Omega/\square$
B: surface specific resistance is at least $1 \times 10^{13} \Omega/\square$ and less than $5 \times 10^{13} \Omega/\square$
D: surface specific resistance is less than $1 \times 10^{13} \Omega/\square$.

K. Electrical Insulation

A thermosetting adhesive was uniformly coated on opposite surfaces of the film to a thickness after drying of 5 µm, and "Nomex" (Registered Trademark) (type 410, thickness 50 µm) manufactured by DuPont Teijin Advanced Paper was laminated on opposite surfaces of the film by thermal lamination with the intervening adhesive.

The resulting laminate was cut into squares of 25 cm×25 cm, and after controlling the moisture for 24 hours in a room at 23° C. and relative humidity of 65%, dielectric breakdown voltage (kV/ram) per unit thickness was measured according to JIS C2151 (2006) using an AC dielectric breakdown tester (AC, 30 kV; manufactured by Kasuga Denki Inc.) at a frequency of 60 Hz and voltage elevation speed of 1000 V/sec. The thickness of the laminate was measured by using a dial gauge thickness meter (manufactured by Mitutoyo Corporation) having a flat tip. The electric insulation was evaluated by the following criteria. A and B are preferable as a highly insulative material.

A: breakdown voltage of at least 150 kV/mm
B: breakdown voltage of at least 100 kV/mm and less than 150 kV/m
D: breakdown voltage of less than 100 kV/mm L. Heat Dissipation A thermosetting adhesive was uniformly coated on opposite surfaces of the film to a thickness after drying of 5 µm, and "Nomex" (Registered Trademark) (type 410, thickness 50 µm) manufactured by DuPont Teijin Advanced Paper was laminated on opposite surfaces of the film by thermal lamination with the intervening adhesive.

From the resulting laminate, circles with the diameter of 8 cm were cut out, and the thus cut out circles were laminated to a thickness in the range of 1 to 1.5 mm. The laminate was placed on a planar heat source (3W) having a diameter of 3 cm in the atmosphere at room temperature (25° C.) so that one surface of the laminate was in close contact with the surface of the planar heat source. The laminate circles were placed so that their center was aligned, and heat dissipation silicone grease (G-775) manufactured by Shin-Etsu Chemical Co., Ltd. was thinly coated over the interface between the laminate and the surface heat source and the interface between the laminates so that the air would not enter the interface. At 5 minutes after the placing of the laminate, temperature of the laminate on the surface opposite to the heat source was measured by thermography (manufactured by Nippon Avionics Co., Ltd). The measurement was conducted at 2 positions, namely, at a position corresponding to the center of the circular laminate, and position corresponding to the edge of the circular laminate, and the temperature at the circle center and the temperature at the circle edge were respectively designated Tc(° C.) and Te(° C.). A smaller difference between the Tc and the Te means that the heat is diffused to the surrounding area to relax the hot spot. The heat dissipation was evaluated by the following criteria, and A to C are preferable for use as a material exhibiting a high heat dissipation.

A: Tc-Te is less than 10° C.
B: Tc-Te is at least 10° C. and less than 15° C.
C: Tc-Te is at least 15° C. and less than 20° C.
D: Tc-Te is at least 20° C.

M. Workability

A thermosetting adhesive was uniformly coated on opposite surfaces of the film to a thickness after drying of 5 µm, and "Nomex" (Registered Trademark) (type 410, thickness 50 µm) manufactured by DuPont Teijin Advanced Paper was laminated on opposite surfaces of the film by thermal lamination with the intervening adhesive.

Next, the resulting laminate was evaluated by crease-flex test according to JIS-K-6328 using Scott Type Crease-Flex Abrasion Tester (manufactured by Toyo Seiki Kogyo Co., Ltd.). The measurement was conducted with the samples of 10 mm (width)×200 mm (length) under the load of 2.5 kg to determine the number of cycles until cleavage or breakage at the lamination interface was visually confirmed. The workability was evaluated by the following criteria. A and B are practically acceptable.

A: at least 100
B: at least 50 and less than 100
D: at least 50

N. Adhesion to Smooth Surface

A thermosetting adhesive was uniformly coated on opposite surfaces of the film to a thickness after drying of 5 µm, and PPS film "Torelina" (Registered Trademark) (type 3030, thickness 16 μm) manufactured by Toray Industries, Inc. was laminated on opposite surfaces of the film by thermal lamination with the intervening adhesive. Samples with a width of 10 mm and a length of 200 mm were cut and the samples were analyzed on a tensile tester manufactured by Daiei Kagaku Seiki MFG. Co., Ltd. under the conditions including the speed of 200 mm/minute by holding at an angle of 180° according to JIS K 6854-2 (1999). Line of optimal load was depicted from the thus obtained data of the peel length (mm) and the peel load (N) by optimal line method to determine the peel strength at 180°. The adhesion to the smooth surface was evaluated by the following criteria. A and B are preferable in the practical point of view.

A: at least 3.0 N/cm
B: at least 1.0 N/cm and less than 3.0 N/cm
C: less than 1.0 N/cm

EXAMPLES

Next, the present invention is described by referring to Examples which by no means limit the scope of the invention.

Reference Example 1-1

The polycondensation was conducted by using dimethyl terephthalate for the acid component, ethylene glycol for the diol component, and germanium oxide for the polymerization catalyst to produce polyester pellets having an intrinsic viscosity of 0.65. The thus obtained polyester had a glass transition temperature Tg of 83° C., a melting temperature Tm of 255° C., and a crystal fusion heat of 37 J/g.

Reference Example 1-2

In an autoclave, 9.44 kg (80 moles) of 47% sodium hydrosulfide, 3.43 kg (82.4 moles) of 96% sodium hydroxide, 13.0 kg (131 moles) of N-methyl-2-pyrrolidone (NMP), 2.86 kg (34.9 moles) of sodium acetate, and 12 kg of ion exchanged water were charged, and the mixture was gradually heated to 235° C. in 3 hours at standard pressure while purging with nitrogen to distill 17.0 kg of water and 0.3 kg (3.23 moles) of NMP, and the reaction vessel was cooled to 160° C. Next, after adding 11.5 kg (78.4 moles) of p-dichlorobenzene (p-DCB) for the main-component monomer and 0.007 kg (0.04 mole of 1,2,4-trichlorobenzene) for the sub-component monomer and then 22.2 kg (223 moles) of NMP, the reaction vessel was sealed with nitrogen gas and the temperature was raised from 200° C. to 270° C. at a rate of 0.6° C./minute with stirring at 400 rpm. After maintaining the temperature at 270° C. for 30 minutes, 1.11 kg (61.6 moles) of water was added to the system in 10 minutes and the reaction was allowed to proceed at 270° C. for 100 minutes. Next, after re-introducing 1.60 kg (88.8 moles) of water to the system and cooling to 240° C., the system was cooled to 210° C. at a rate of 0.4° C./minute and then quenched to near room temperature. The content was collected and distilled with 32 liters of NMP, and the solvent and the solid component were separated with a sieve (80 mesh). The resulting particles were washed again with 38 liters of NMP at 85° C., and 5 times with 67 liters of warm water. After separation by filtration, the particles were washed 5 times with 70,000 g of 0.05% by weight aqueous solution of calcium acetate. After separation by filtration, the resulting particles were dried at 60° C. with hot air, and dried at 120° C. under reduced pressure for 20 hours to obtain white PPS resin particulate material. The resulting PPS resin particulate material had a glass transition temperature Tg of 92° C., a melting temperature Tm of 280° C., and a crystal fusion heat of 33 J/g.

Reference Example 2-1

Wollastonite particles (K400 manufactured by Keiwa Rozai Co, Ltd.) having an average particle diameter of 17 μm and an aspect ratio of 4 were placed in a Henschel mixer and stirred. To this wollastonite particles, silane coupling agent (KBM-403 manufactured by Shin-Etsu Chemical Co., Ltd.) was added by spraying so that the silane coupling agent was at 1% by weight in relation to 100% by weight of the wollastonite particles. After stirring with heating at 70° C. for 2 hours, the particles were collected to produce surface treated wollastonite particles.

Reference Example 2-2

Silica particles having an average particle diameter of 1 μm and an aspect ratio of 1 were placed in a Henschel mixer and stirred. To this wollastonite particles, silane coupling agent (KBM-403 manufactured by Shin-Etsu Chemical Co., Ltd.) was added by spraying so that the silane coupling agent was at 1% by weight in relation to 100% by weight of the wollastonite particles. After stirring with heating at 70° C. for 2 hours, the particles were collected to produce surface treated silane particles.

Reference Example 2-3

Wollastonite particles (FPW#150 manufactured by Kinsei Matec Co. Ltd.) having an average particle diameter of 30 μm and an aspect ratio of 4 were placed in a Henschel mixer and stirred. To this wollastonite particles, silane coupling agent (KBM-403 manufactured by Shin-Etsu Chemical Co., Ltd.) was added by spraying so that the silane coupling agent was at 1% by weight in relation to 100% by weight of the wollastonite particles. After stirring with heating at 70° C. for 2 hours, the particles were collected to produce surface treated wollastonite particles.

Reference Example 3-1

A co-rotating vented twin screw kneading extruder provided with at least one side feed port and at least one kneading puddle-kneading section (screw diameter, 30 mm; screw length/screw diameter, 45.5; manufactured by The Japan Steel Works, Ltd.) was heated to 265° C., and 60 parts by weight of the polyester produced in Reference Example 1-1 was fed from the main feed port, and 40 parts by weight of the surface treated wollastonite particles produced in Reference Example 2-1 were fed from the side feed port. After melt kneading, the mixture was extruded in strand form, cooled with water at temperature of 25° C., and immediately cut to produce master pellets containing 40% by weight of the wollastonite particles.

Reference Example 3-2

A co-rotating vented twin screw kneading extruder provided with at least one side feed port and at least one kneading puddle-kneading section (screw diameter, 30 mm; screw length/screw diameter, 45.5; manufactured by The Japan Steel Works, Ltd.) was heated to 265° C., and 90 parts by weight of the polyester produced in Reference Example 1-1 was fed from the main feed port, and 10 parts by weight of the surface treated silica particles produced in Reference Example 2-2 were fed from the side feed port. After melt kneading, the mixture was extruded in strand form, cooled with water at temperature of 25° C., and immediately cut to produce master pellets containing 10% by weight of the silica particles.

Reference Example 3-3

A co-rotating vented twin screw kneading extruder provided with at least one side feed port and at least one kneading puddle-kneading section (screw diameter, 30 mm; screw length/screw diameter, 45.5; manufactured by The Japan Steel Works, Ltd.) was heated to 265° C., and 94.0 parts by weight of the polyester produced in Reference Example 1-1 was fed from the main feed port, and 2.0 parts by weight of the surface treated silica particles produced in Reference Example 2-2 and 4.0 parts by weight of multi-layer carbon nanotubes having an average fiber diameter of 0.06 μm and an average fiber length of 10 μm were fed from the side feed port. After melt kneading, the mixture was extruded in strand form, cooled with water at temperature of 25° C., and immediately cut to produce master pellets containing 2.0% by weight of the silica particles and 4.0% by weight of the multi-layer carbon nanotubes.

Reference Example 3-4

A co-rotating vented twin screw kneading extruder provided with at least one side feed port and at least one kneading puddle-kneading section (screw diameter, 30 mm; screw length/screw diameter, 45.5; manufactured by The Japan Steel Works, Ltd.) was heated to 265° C., and 70 parts by weight of the polyester produced in Reference Example 1-1 was fed from the main feed port, and 2.0 parts by weight of the surface treated silica particles produced in Reference Example 2-2 and 28.0 parts by weight of the wollastonite particles produced in Reference Example 2-3 were fed from the side feed port. After melt kneading, the mixture was extruded in strand form, cooled with water at temperature of 25° C., and immediately cut to produce master pellets containing 2.0% by weight of the silica particles and 28.0% of the wollastonite particles.

Reference Example 3-5

The PPS particulate material produced in Reference Example 1-2 was melt kneaded in a single screw extruder at 320° C. and extruded in strand shape. The extrudate in strand shape was cut by a cutter to produce pellets.

Reference Example 3-6

A co-rotating vented twin screw kneading extruder provided with at least one side feed port and at least one kneading puddle-kneading section (screw diameter, 30 mm; screw length/screw diameter, 45.5; manufactured by The Japan Steel Works, Ltd.) was heated to 310° C., and 60 parts by weight of the PPS resin produced in Reference Example 1-2 were fed from the main feed port, and 40 parts by weight of the surface treated wollastonite particles produced in Reference Example 2-1 were fed from the side feed port. After melt kneading, the mixture was extruded in strand form, cooled with water at temperature of 25° C., and immediately cut to produce master pellets containing 40% by weight of the wollastonite particles.

Example 1

67.5 parts by weight of the master pellets produced in Reference Example 3-1 and 32.5 parts by weight of the polyester produced in Reference Example 1-1 were mixed, and the mixture was dried in vacuum at a temperature of 180° C. for 3 hours and supplied to an extruder. The mixture was melted at 280° C. in nitrogen atmosphere, and introduced to the T die nozzle. Next, from the T die nozzle, the mixture was extruded in sheet form to form a molten monolayer sheet, and this sheet was cooled by adhering and solidifying the sheet on a drum kept at a surface temperature 25° C. by applying static electricity to obtain a monolayer film to be stretched.

Next, after pre-heating the monolayer film to be stretched by rolls heated to a temperature of 90° C., the film was stretched to 2.5 folds in longitudinal direction (length direction) by using rolls heated to the temperature of 100° C., and the film was cooled with rolls at a temperature of 25° C. to produce a monoaxially stretched film. The resulting monoaxially stretched film was introduced to the preheating zone in the tenter at a temperature of 90° C. with the opposite edges of the film held by clips, and then, the film was continuously stretched 2.75 folds in the direction perpendicular to the longitudinal direction (width direction). The film was subsequently subjected to a heat treatment at a temperature of 220° C. for 20 seconds in a heat treatment zone 1 in the tenter, and then, to a heat treatment at a temperature of 150° C. in a heat treatment zone 2, and then, to a heat treatment at a temperature of 100° C. in a heat treatment zone 3. It is to be noted, in the heat treatment, 4% relaxing treatment in the width direction was conducted between the heat treatment zone 1 and the heat treatment zone 2. After homogeneous slow cooling, the film was wound to produce a biaxially stretched film having a thickness of 50 μm. The resulting film had the physical characteristics and the properties as shown in Table 1.

Example 2

The procedure of Example 1 was repeated except that the amount of the master pellets supplied to the extruder was changed to 40.0 parts by weight, and the amount of the polyester was changed to 60.0 parts by weight in Example 1 to produce a biaxially stretched film having a thickness of 50 μm. The resulting film had the physical characteristics and the properties as shown in Table 1.

Example 3

The procedure of Example 1 was repeated except that the amount of the master pellets supplied to the extruder was changed to 30.0 parts by weight, and the amount of the polyester was changed to 70.0 parts by weight in Example 1 to produce a biaxially stretched film having a thickness of 50 μm. The resulting film had the physical characteristics and the properties as shown in Table 1.

Comparative Example 3

The procedure of Example 1 was repeated except that the amount of the master pellets supplied to the extruder was changed to 20.0 parts by weight, and the amount of the polyester was changed to 80.0 parts by weight in Example 1 to produce a biaxially stretched film having a thickness of 50 μm. The resulting film had the physical characteristics and the properties as shown in Table 1.

Example 4

The procedure of Example 1 was repeated except that wollastonite particles (SH-1800 manufactured by Kinsei Matec Co. Ltd.) having an average particle diameter of 4 μm and an aspect ratio 8 were used instead of the wollastonite particles having an average particle diameter 17 μm and an aspect ratio of 4 in Reference Example 2-1 to produce a biaxially stretched film having a thickness of 50 μm. The resulting film had the physical characteristics and the properties as shown in Table 1.

Comparative Example 1

10.0 parts by weight of the master pellets produced in Reference Example 3-2 and 90.0 parts by weight of the polyester produced in Reference Example 1-1 were mixed, and the mixture was dried in vacuum at a temperature of 180° C. for 3 hours and supplied to an extruder. The mixture was melted at 280° C. in nitrogen atmosphere, and introduced to the T die nozzle. Next, from the T die nozzle, the mixture was extruded in sheet form to form a molten monolayer sheet, and this sheet was cooled by adhering and solidifying the sheet on a drum kept at a surface temperature 25° C. by applying static electricity to obtain a monolayer film to be stretched. Subsequently, the stretching was conducted by repeating the procedure of Example 1 to produce a biaxially stretched film having a thickness of 50 μm. The resulting film had the physical characteristics and the properties as shown in Table 1.

Comparative Example 7

50.0 parts by weight of the master pellets produced in Reference Example 3-3 and 50.0 parts by weight of the polyester produced in Reference Example 1-1 were mixed, and the mixture was dried in vacuum at a temperature of 180° C. for 3 hours and supplied to an extruder. The mixture was melted at 280° C. in nitrogen atmosphere, and introduced to the T die nozzle. Next, from the T die nozzle, the mixture was extruded in sheet form to form a molten monolayer sheet, and this sheet was cooled by adhering and solidifying the sheet on a drum kept at a surface temperature 25° C. by applying static electricity to obtain a monolayer film to be stretched. Subsequently, the stretching was conducted by repeating the procedure of Example 1 to produce a biaxially stretched film having a thickness of 50 μm. The resulting film had the physical characteristics and the properties as shown in Table 1.

Example 6

50.0 parts by weight of the master pellets produced in Reference Example 3-4 and 50.0 parts by weight of the polyester produced in Reference Example 1-1 were mixed, and the mixture was dried in vacuum at a temperature of 180° C. for 3 hours and supplied to an extruder. The mixture was melted at 280° C. in nitrogen atmosphere, and introduced to the T die nozzle. Next, from the T die nozzle, the mixture was extruded in sheet form to form a molten monolayer sheet, and this sheet was cooled by adhering and solidifying the sheet on a drum kept at a surface temperature 25° C. by applying static electricity to obtain a monolayer film to be stretched. Subsequently, the stretching was conducted by repeating the procedure of Example 1 to produce a biaxially stretched film having a thickness of 50 μm. The resulting film had the physical characteristics and the properties as shown in Table 1.

Comparative Example 2

The procedure of Comparative Example 1 was repeated except that the amount of the master pellets supplied to the extruder was changed to 60.0 parts by weight, and the amount of the polyester was changed to 40.0 parts by weight in Comparative Example 1 to produce a biaxially stretched film having a thickness of 50 μm. The resulting film had the physical characteristics and the properties as shown in Table Comparative Example 4

The procedure of Example 2 was repeated except that the stretching ratio in the longitudinal direction was changed to 3.6 and the stretching ratio in the width direction was changed to 3.6 in Example 2 to produce a biaxially stretched film having a thickness of 50 μm. The resulting film had the physical characteristics and the properties as shown in Table 1.

Comparative Example 6

The procedure of Example 1 was repeated except that the thickness was adjusted to 50 μm in the course of producing the monolayer film to be stretched and the subsequent steps were omitted in Example 1 to produce a non-stretched monolayer film having a thickness of 50 μm. The resulting film had the physical characteristics and the properties as shown in Table 1.

Example 5

The biaxially stretched film having a thickness of 50 μm obtained in Comparative Example 1 and the mold 1 as described below were heated to 200° C., and the sheet and the surface of the mold formed with the projections and the recesses were brought in contact with each other. After pressing at 20 MPa and retaining the state for 2 minutes, the mold was cooled and the pressing was ceased. The sheet was then released from the mold to obtain a film provided with the projections and the recesses on the surface. The resulting film had the physical characteristics and the properties as shown in Table 1.

Mold 1
Material: nickel, dot pattern
Projections: pitch, 140 μm; width, 70 μm; height, 10 μm Comparative Example 5

The biaxially stretched film having a thickness of 50 μm obtained in Comparative Example 2 and the mold 2 as described below were heated to 200° C., and the sheet and the surface of the mold formed with the projections and the recesses were brought in contact with each other. After pressing at 20 MPa and retaining the state for 2 minutes, the mold was cooled and the pressing was ceased. The sheet was then released from the mold to obtain a film provided with the projections and the recesses on the surface. The resulting film had the physical characteristics and the properties as shown in Table 1.

Mold 2
Material: nickel, dot pattern
Projections: pitch, 500 μm; width, 380 μm; height, 100 μm

Example 7

The procedure of Example 1 was repeated except that ejection rate of the extruder was adjusted so that the thickness of the film after the biaxial stretching was 250 μm in Example 1 to produce a biaxially stretched film having a thickness of 250 μm. The resulting film had the physical characteristics and the properties as shown in Table 1.

Example 8

2 extruders (extruder A and extruder B) were used. A mixture of 67.5 parts by weight of the master pellets produced in Reference Example 3-1 and 32.5 parts by weight of the polyester produced in Reference Example 1-1 was supplied to the extruder A after drying the mixture in vacuum at a temperature of 180° C. for 3 hours. To the extruder B, the polyester produced in Reference Example 1-1 was solely supplied after drying in vacuum at a temperature of 180° C. for 3 hours. The resins supplied to the extruders were melted in each extruder at a temperature of 280° C. in nitrogen atmosphere, and introduced to the T die nozzle so that the resins were laminated in three layers such that the resin from the extruder B was on opposite surfaces of the resin from the extruder A. The resins were laminated so that the thickness ratio of the three layers was 1:10:1. Next, the resins were extruded from the T die nozzle in sheet form to form a molten laminate sheet, and this sheet was cooled by adhering and solidifying the sheet on a drum kept at a surface temperature 25° C. by applying static electricity to obtain a laminate film to be stretched. Subsequently, the stretching was conducted by repeating the procedure of Example 1 to produce a biaxially stretched film having a thickness of 50 μm. The resulting film had the physical characteristics and the properties as shown in Table 1.

Example 9

The procedure of Example 8 was repeated except that the amount of the master pellets supplied to the extruder A was changed to 40.0 parts by weight, and the amount of the polyester was changed to 60.0 parts by weight in Example 8 to produce a biaxially stretched film having a thickness of 50 μm. The resulting film had the physical characteristics and the properties as shown in Table 1.

Example 10

The procedure of Example 8 was repeated except that the amount of the master pellets supplied to the extruder A was changed to 30.0 parts by weight, and the amount of the polyester was changed to 70.0 parts by weight in Example 8 to produce a biaxially stretched film having a thickness of 50 μm. The resulting film had the physical characteristics and the properties as shown in Table 1.

Comparative Example 9

The procedure of Example 1 was repeated except that the amount of the master pellets supplied to the extruder A was changed to 20.0 parts by weight, and the amount of the polyester was changed to 80.0 parts by weight in Example 8 to produce a biaxially stretched film having a thickness of 50 μm. The resulting film had the physical characteristics and the properties as shown in Table 1.

Example 11

The procedure of Example 8 was repeated except that wollastonite particles (SH-1800 manufactured by Kinsei Matec Co. Ltd.) having an average particle diameter of 4 μm and an aspect ratio of 8 were used instead of the wollastonite particles having an average particle diameter of 17 μm and an aspect ratio of 4 in Reference Example 2-1 to produce a biaxially stretched film having a thickness of 50 μm. The resulting film had the physical characteristics and the properties as shown in Table 1.

Example 18

The procedure of Example 8 was repeated except that metal silicon particles (M-Si#350 manufactured by Kinsei Matec Co. Ltd.) having an average particle diameter of 14 μm were used instead of the wollastonite particles having an average particle diameter of 17 μm and an aspect ratio of 4 in Reference Example 2-1 to produce a biaxially stretched film having a thickness of 50 μm. The resulting film had the physical characteristics and the properties as shown in Table 1.

Example 19

The procedure of Example 8 was repeated except that aluminosilicate particles (SILATHERM T 1360-012 manufactured by Quarzwerke) having an average particle diameter of 16 μm were used instead of the wollastonite particles having an average particle diameter of 17 μm and an aspect ratio of 4 in Reference Example 2-1 to produce a biaxially stretched film having a thickness of 50 μm. The resulting film had the physical characteristics and the properties as shown in Table 1.

Example 12

The procedure of Example 8 was repeated except that a mixture of 50.0 parts by weight of the master pellets obtained in Reference Example 3-4 and 50.0 parts by weight of the polyester obtained in Reference Example 1-1 was dried in vacuum at a temperature of 180° C. for 3 hours and then supplied to extruder A for melting at a temperature of 280° C. in nitrogen atmosphere to produce a biaxially stretched film having a thickness of 50 μm. The resulting film had the physical characteristics and the properties as shown in Table

Comparative Example 10

The procedure of Example 8 was repeated except that a mixture of the 10.0 parts by weight of the master pellets obtained in Reference Example 3-2 and 90.0 parts by weight of the polyester obtained in Reference Example 1-1 was supplied to the extruder A to produce a biaxially stretched film having a thickness of 50 μm. The resulting film had the physical characteristics and the properties as shown in Table

Example 13

The procedure of Example 8 was repeated except that ejection rate of the extruder was adjusted so that the thickness of the film after the biaxial stretching was 250 μm in Example 8 to produce a biaxially stretched film having a thickness of 250 μm. The resulting film had the physical characteristics and the properties as shown in Table 1.

Example 14

The procedure of Example 8 was repeated except that the thickness ratio of the three-layer laminate was changed to 1:16:1 to produce a biaxially stretched film having a thickness of 50 μm. The resulting film had the physical characteristics and the properties as shown in Table 1.

Example 15

The procedure of Example 8 was repeated except that the thickness ratio of the three-layer laminate was changed to 1:8:1 to produce a biaxially stretched film having a thickness of 50 μm. The resulting film had the physical characteristics and the properties as shown in Table 1.

Example 16

The procedure of Example 8 was repeated except that the thickness ratio of the three-layer laminate was changed to 1:6:1 to produce a biaxially stretched film having a thickness of 50 μm. The resulting film had the physical characteristics and the properties as shown in Table 1.

Comparative Example 8

The procedure of Example 8 was repeated except that the thickness ratio of the three-layer laminate was changed to 1:4:1 to produce a biaxially stretched film having a thickness of 50 μm. The resulting film had the physical characteristics and the properties as shown in Table 1.

Comparative Example 11

The procedure of Example 9 was repeated except that the stretching ratio in the longitudinal direction was changed to 3.6 and the stretching ratio in the width direction was changed to 3.6 in Example 9 to produce a biaxially stretched film having a thickness of 50 μm. The resulting film had the physical characteristics and the properties as shown in Table

Example 17

2 extruders (extruder A and extruder B) were used. A mixture of 67.5 parts by weight of the master pellets produced in Reference Example 3-6 and 32.5 parts by weight of the pellet produced in Reference Example 3-5 was supplied to the Extruder A after drying the mixture in vacuum at a temperature of 180° C. for 3 hours. To the extruder B, the pellets produced in Reference Example 3-5 were solely supplied after drying in vacuum at a temperature of 180° C. for 3 hours. The resins supplied to the extruders were melted in each extruder at a temperature of 320° C. in nitrogen atmosphere, and introduced to the T die nozzle so that the resins were laminated in three layers such that the resin from the extruder B was on opposite surfaces of the resin from the extruder A. The resins were laminated so that the thickness ratio of the three layers was 1:10:1. Next, the resins were extruded from the T die nozzle in sheet form to form a molten laminate sheet, and this sheet was cooled by adhering and solidifying the sheet on a drum kept at a surface temperature 25° C. by applying static electricity to obtain a laminate film to be stretched.

Next, after pre-heating the monolayer film to be stretched by rolls heated to a temperature of 100° C., the film was stretched to 2.5 folds in longitudinal direction (length direction) by using rolls heated to a temperature of 110° C., and the film was cooled with rolls at a temperature of 25° C. to produce a monoaxially stretched film. The resulting monoaxially stretched film was introduced to the preheating zone in the tenter at a temperature of 100° C. with the opposite edges of the film held by clips, and then, the film was continuously stretched 2.75 folds in the direction perpendicular to the longitudinal direction (width direction) in the heating zone at a temperature of 110° C. The film was subsequently subjected to a heat treatment at a temperature of 180° C. in a heat treatment zone 1 in the tenter, and then, to a heat treatment at a temperature of 230° C. in a heat treatment zone 2, and then, to a heat treatment at a temperature of 130° C. in a heat treatment zone 3. It is to be noted, in the heat treatment, 4% relaxing treatment in the width direction was conducted between the heat treatment zone 1 and the heat treatment zone 2. After homogeneous slow cooling, the film was wound to produce a biaxially stretched film having a thickness of 50 μm. The resulting film had the physical characteristics and the properties as shown in Table 1.

TABLE 1

|  |  |  |  | Ex. 1 | Ex. 2 | Ex. 3 | Ex. 4 | Ex. 5 | Ex. 6 | Ex. 7 |
|---|---|---|---|---|---|---|---|---|---|---|
| Physical properties of the film | P1 layer | Inorganic particle content Vf1 in P1 layer | % by volume | 15 | 8 | 6 | 15 | 0.5 | 7 | 15 |
|  |  | Porosity Va in P1 layer | % by volume | 5.1 | 3.8 | 3.7 | 14 | 0.55 | 5 | 5.1 |
|  |  | Va/Vf1 | — | 0.34 | 0.48 | 0.62 | 0.93 | 1.10 | 0.71 | 0.34 |
|  |  | Inorganic particle number Nf in P1 layer | /10000 μm² | 85 | 43 | 31 | 160 | 6 | 100 | 85 |
|  |  | Nf/Vf1 | — | 6 | 5 | 5 | 11 | 12 | 14 | 6 |
|  |  | Mean diameter of the corresponding circle of the inorganic particle in P1 layer | μm | 15 | 15 | 15 | 3.5 | 1 | 11 | 15 |
|  | Film | Number of coarse projections SPc(4000) | /mm² | 60 | 44 | 20 | 25 | 49 | 31 | 55 |
|  |  | Surface roughness SRa | nm | 1000 | 750 | 320 | 450 | 700 | 650 | 850 |
|  |  | Thickness T | μm | 50 | 50 | 50 | 50 | 50 | 50 | 250 |
|  |  | Content Vfa of the inorganic particles in the thickness range of surface to 0.1T | % by volume | 15 | 8 | 6 | 15 | 0.5 | 7 | 15 |
|  |  | Content Vfb of the inorganic particles in the thickness range of 0.1T to 0.9T | % by volume | 15 | 8 | 6 | 15 | 0.5 | 7 | 15 |
|  |  | Vfa/Vfb | — | 1 | 1 | 1 | 1 | 1 | 1 | 1 |
|  |  | Thermal conductivity | W/mK | 0.29 | 0.23 | 0.18 | 0.19 | 0.15 | 0.21 | 0.29 |
|  |  | Surface specific resistance | — | A | A | A | A | A | A | A |

TABLE 1-continued

| Properties | | | | Ex. 1 | Ex. 2 | Ex. 3 | Ex. 4 | Ex. 5 | Ex. 6 | Ex. 7 |
|---|---|---|---|---|---|---|---|---|---|---|
| | | Electric insulation | — | B | B | A | A | A | B | B |
| | | Heat dissipation | — | A | B | C | C | C | B | A |
| | | Workability | — | B | B | A | A | A | B | B |
| | | Adhesion to smooth surface | — | C | C | C | C | A | C | C |

| | | | | Ex. 8 | Ex. 9 | Ex. 10 | Ex. 11 | Ex. 12 | Ex. 13 | Ex. 14 |
|---|---|---|---|---|---|---|---|---|---|---|
| Physical properties of the film | P1 layer | Inorganic particle content Vf1 in P1 layer | % by volume | 15 | 8 | 6 | 15 | 7 | 15 | 15 |
| | | Porosity Va in P1 layer | % by volume | 5.1 | 3.8 | 3.7 | 14 | 5 | 5.1 | 5.1 |
| | | Va/Vf1 | — | 0.34 | 0.48 | 0.62 | 0.93 | 0.71 | 0.34 | 0.34 |
| | | Inorganic particle number Nf in P1 layer | /10000 μm² | 85 | 43 | 31 | 160 | 100 | 85 | 85 |
| | | Nf/Vf1 | — | 6 | 5 | 5 | 11 | 14 | 6 | 6 |
| | | Mean diameter of the corresponding circle of the inorganic particle in P1 layer | μm | 15 | 15 | 15 | 3.5 | 11 | 15 | 15 |
| | Film | Number of coarse projections SPc(4000) | /mm² | 50 | 34 | 15 | 16 | 21 | 45 | 55 |
| | | Surface roughness SRa | nm | 900 | 650 | 220 | 350 | 550 | 750 | 950 |
| | | Thickness T | μm | 50 | 50 | 50 | 50 | 50 | 250 | 50 |
| | | Content Vfa of the inorganic particles in the thickness range of surface to 0.1T | % by volume | 5.5 | 2.9 | 2.2 | 5.5 | 2.6 | 5.5 | 8.6 |
| | | Content Vfb of the inorganic particles in the thickness range of 0.1T to 0.9T | % by volume | 15 | 8 | 6 | 15 | 7 | 15 | 15 |
| | | Vfa/Vfb | — | 0.37 | 0.37 | 0.37 | 0.37 | 0.37 | 0.37 | 0.58 |
| | | Thermal conductivity | W/mK | 0.28 | 0.22 | 0.17 | 0.18 | 0.2 | 0.28 | 0.29 |
| Properties | | Surface specific resistance | — | A | A | A | A | A | A | A |
| | | Electric insulation | — | B | B | A | A | B | B | B |
| | | Heat dissipation | — | A | B | C | C | B | A | A |
| | | Workability | — | A | A | A | A | A | A | A |
| | | Adhesion to smooth surface | — | A | A | A | A | A | A | A |

| | | | | Ex. 15 | Ex. 16 | Ex. 17 | Ex. 18 | Ex. 19 | Comp. Ex. 1 | Comp. Ex. 2 | Comp. Ex. 3 |
|---|---|---|---|---|---|---|---|---|---|---|---|
| Physical properties of the film | P1 layer | Inorganic particle content Vf1 in P1 layer | % by volume | 15 | 15 | 15 | 15 | 15 | 0.5 | 3 | 4 |
| | | Porosity Va in P1 layer | % by volume | 5.1 | 5.1 | 9.2 | 5.2 | 5.4 | 0.55 | 3.5 | 2.5 |
| | | Va/Vf1 | — | 0.34 | 0.34 | 0.61 | 0.35 | 0.36 | 1.10 | 1.17 | 0.63 |
| | | Inorganic particle number Nf in P1 layer | /10000 μm² | 85 | 85 | 81 | 78 | 75 | 6 | 40 | 23 |
| | | Nf/Vf1 | — | 6 | 6 | 5 | 5 | 5 | 12 | 13 | 6 |
| | | Mean diameter of the corresponding circle of the inorganic particle in P1 layer | μm | 15 | 15 | 15 | 14 | 19 | 1 | 1 | 15 |
| | Film | Number of coarse projections SPc(4000) | /mm² | 35 | 20 | 53 | 51 | 45 | 0 | 0 | 11 |
| | | Surface roughness SRa | nm | 500 | 300 | 870 | 920 | 890 | 40 | 390 | 400 |
| | | Thickness T | μm | 50 | 50 | 50 | 50 | 50 | 50 | 50 | 50 |
| | | Content Vfa of the inorganic particles in the thickness range of surface to 0.1T | % by volume | 3 | 1 | 5.5 | 5.5 | 5.5 | 0.5 | 3 | 4 |
| | | Content Vfb of the inorganic particles in the thickness range of 0.1T to 0.9T | % by volume | 15 | 15 | 15 | 15 | 15 | 0.5 | 3 | 4 |
| | | Vfa/Vfb | — | 0.20 | 0.07 | 0.37 | 0.37 | 0.37 | 1 | 1 | 1 |
| | | Thermal conductivity | W/mK | 0.25 | 0.18 | 0.24 | 0.33 | 0.33 | 0.13 | 0.13 | 0.13 |
| Properties | | Surface specific resistance | — | A | A | A | A | A | A | A | A |
| | | Electric insulation | — | A | A | B | B | B | A | A | A |
| | | Heat dissipation | — | A | C | B | A | A | D | D | D |
| | | Workability | — | A | A | A | A | A | A | A | A |
| | | Adhesion to smooth surface | — | A | A | A | A | A | A | A | A |

| | | | | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 |
|---|---|---|---|---|---|---|---|---|---|---|---|
| Physical properties of the film | P1 layer | Inorganic particle content Vf1 in P1 layer | % by volume | 8 | 0.5 | 15 | 0.5 | 15 | 4 | 0.5 | 8 |
| | | Porosity Va in P1 layer | % by volume | 15 | 0.55 | 0.3 | 3 | 5.1 | 2.5 | 0.55 | 15 |
| | | Va/Vf1 | — | 1.88 | 1.10 | 0.02 | 6.00 | 0.34 | 0.63 | 1.10 | 1.88 |
| | | Inorganic particle number Nf in P1 layer | /10000 μm² | 41 | 6 | 400 | 6 | 85 | 23 | 6 | 41 |
| | | Nf/Vf1 | — | 5 | 12 | 27 | 12 | 6 | 6 | 12 | 5 |
| | | Mean diameter of the corresponding circle of the inorganic particle in P1 layer | μm | 15 | 1 | 15 | 1 | 15 | 15 | 1 | 15 |
| | Film | Number of coarse projections SPc(4000) | /mm² | 13 | 0 | 0 | 0 | 10 | 8 | 0 | 13 |
| | | Surface roughness SRa | nm | 310 | 1500 | 20 | 110 | 90 | 80 | 30 | 90 |
| | | Thickness T | μm | 50 | 50 | 50 | 50 | 50 | 50 | 50 | 50 |

TABLE 1-continued

|  |  |  |  |  |  |  |  |  |  |
|---|---|---|---|---|---|---|---|---|---|
|  | Content Vfa of the inorganic particles in the thickness range of surface to 0.1T | % by volume | 8 | 0.5 | 15 | 0.5 | 0 | 1.5 | 0.2 | 2.9 |
|  | Content Vfb of the inorganic particles in the thickness range of 0.1T to 0.9T | % by volume | 8 | 0.5 | 15 | 0.5 | 15 | 4 | 5 | 6 |
|  | Vfa/Vfb | — | 1 | 1 | 1 | 1 | 0 | 0.37 | 0.04 | 0.49 |
|  | Thermal conductivity | W/mK | 0.09 | 0.13 | 0.19 | 0.14 | 0.13 | 0.13 | 0.13 | 0.09 |
|  | Surface specific resistance | — | A | A | A | D | A | A | A | A |
| Properties | Electric insulation | — | B | A | B | D | A | A | A | B |
|  | Heat dissipation | — | D | D | C | D | D | D | D | D |
|  | Workability | — | B | A | D | B | A | A | A | A |
|  | Adhesion to smooth surface | — | B | A | D | B | A | A | A | A |

The present invention is capable of providing a film having improved electric insulation, heat dissipation, and workability compared to conventional films. The film provided are adapted for use in the applications where electrical insulation and heat dissipation abilities are important, for example, in the applications including copper clad laminate, solar battery back sheet, adhesive tape, flexible printed board, membrane switch, planar heating element, flat cable, insulation material for rotary machine, insulation material for battery and other applications. The film is also adapted for use as adhesive tape, release film, transfer film, design sheet, building material, and other applications in view of its good surface properties.

EXPLANATION OF NUMERALS

1: length (l)
2: width (b)
3: thickness (t)
4: mold projection
5: mold recess
X: pitch of the mold projections
Y: width of the mold projection
Z: height of the mold projection

The invention claimed is:

1. A film wherein at least one surface has a number of coarse projections SPc(4000) of at least 15/mm$^2$,
   wherein the film has a layer containing inorganic particles (layer P1), and when the layer P1 has an inorganic particle content Vf1 (% by volume) and a porosity Va (% by volume), Va/Vf1 is up to 1.

2. A film according to claim 1 wherein Nf/Vf1 is up to 25 when number of the inorganic particles per 10000 μm$^2$ is Nf in the cross section of the layer P1 cut perpendicular to the planar direction of the film and parallel to the longitudinal direction of the film.

3. A film according to claim 1 wherein mean diameter of the corresponding circle of the inorganic particle is at least 3 μm in the cross section of the layer P1 cut perpendicular to the planar direction of the film and parallel to the longitudinal direction of the film.

4. A film according to claim 1 wherein the film has a layer containing inorganic particles (layer P1), and when the film has a thickness T (μm), and content of the inorganic particles in the range of the film surface to the thickness of 0.1T is Vfa (% by volume) and content of the inorganic particles in the thickness range of 0.1T to 0.9T is Vfb (% by volume) on the film surface having a number of coarse projections SPc (4000) of at least 15/mm$^2$, Vfa/Vfb satisfies the relation: 0≤Vfa/Vfb≤1.

5. A film according to claim 1 wherein thermal conductivity in the film thickness direction is at least 0.15 W/mK, and surface specific resistance is at least $10^{13}$ Ω/□.

6. A film according to claim 1 wherein the film contains a polyester resin as its main component.

7. A film according to claim 1 wherein the surface having the number of coarse projections SPc(4000) of at least 15/mm$^2$ has a surface roughness Ra of at least 100 nm.

8. An electrical insulation sheet prepared by using the film according to claim 1.

9. An adhesive tape prepared by using the film according to claim 1.

10. A rotating machine prepared by using the electrical insulation sheet according to claim 8.

* * * * *

UNITED STATES PATENT AND TRADEMARK OFFICE
CERTIFICATE OF CORRECTION

PATENT NO. : 10,699,827 B2
APPLICATION NO. : 16/085690
DATED : June 30, 2020
INVENTOR(S) : Shohei Yoshida Page 1 of 1

It is certified that error appears in the above-identified patent and that said Letters Patent is hereby corrected as shown below:

On the Title Page

Item (72) "Shohei Yoshida, Otsu (JP)" should read --Shohei Yoshida, Otsu-shi, Shiga (JP)--

Item (72) "Risa Hamasaki, Otsu (JP)" should read --Risa Hamasaki, Otsu-shi, Shiga (JP)--

Item (72) "Shigeru Aoyama, Otsu (JP)" should read --Shigeru Aoyama, Otsu-shi, Shiga (JP)--

Signed and Sealed this
Twenty-fifth Day of August, 2020

Andrei Iancu
*Director of the United States Patent and Trademark Office*